United States Patent [19]

Pomerleau

[11] Patent Number: 5,091,780
[45] Date of Patent: Feb. 25, 1992

[54] A TRAINABLE SECURITY SYSTEM EMTHOD FOR THE SAME

[75] Inventor: Dean A. Pomerleau, Pittsburgh, Pa.

[73] Assignee: Carnegie-Mellon University, Pittsburgh, Pa.

[21] Appl. No.: 521,237

[22] Filed: May 9, 1990

[51] Int. Cl.$^5$ .............................................. H04N 7/18
[52] U.S. Cl. .................................. 358/108; 358/105
[58] Field of Search .................. 358/108, 105; 382/14, 382/15; 364/513

[56] References Cited

U.S. PATENT DOCUMENTS

| | | | |
|---|---|---|---|
| 4,458,266 | 7/1984 | Mahoney | 358/108 X |
| 4,679,077 | 7/1987 | Yunsa et al. | 358/108 |
| 4,692,806 | 9/1987 | Anderson et al. | 358/108 X |
| 4,739,400 | 4/1988 | Veitch | 358/108 |
| 4,928,175 | 5/1990 | Haggren | 358/108 |
| 4,931,868 | 6/1990 | Kadar | 358/105 |

OTHER PUBLICATIONS

"Detection of Explosives in Checked Airline Baggage Using an Artificial Neural System", Shea et al.; *Science Applications International Corporation;* 1989, pp. II-3-1-11-34.

*Primary Examiner*—Victor R. Kostak
*Attorney, Agent, or Firm*—Ansel M. Schwartz

[57] ABSTRACT

A security system comprised of a device for monitoring an area under surveillance. The monitoring device produces images of the area. The security system is also comprised of a device for processing the images to determine whether the area is in a desired state or an undesired state. The processing device is trainable to learn the difference between the desired state and the undesired state. In a preferred embodiment, the monitoring device includes a video camera which produces video images of the area and the processing device includes a computer simulating a neural network. A method for determining whether an area under surveillance is in a desired state or an undesired state. The method comprises the steps of collecting data in a computer about the area which defines when the area is in the desired state or the undesired state. Next, training the computer from the collected data to essentially correctly identify when the area is in the desired state or in the undesired state while the area is under surveillance. Next, performing surveillance of the area with a computer such that the computer determines whether the area is in a desired state or the undesired state.

15 Claims, 5 Drawing Sheets

A TRAINABLE SECURITY SYSTEM EMTHOD FOR THE SAME

FIELD OF THE INVENTION

The present invention is related to security systems. More specifically, the present invention is related to a security system which is trainable to discriminate between real alarm situations and false alarm situations.

BACKGROUND OF THE INVENTION

The current state of the art in security systems indicates a major need for more intelligent systems. The technology available in the marketplace today does not respond well with the problem of maintaining sensitivity to real intruders while avoiding false alarms. The infrared based motion detection alarms are easily triggered by changes in lighting condition which cause temperature changes in the room. The ultrasonic motion detectors are set off by things like air conditioners and ringing telephones. The infrared, ultrasonic and microwave systems are all triggered by events such as curtains moving in a draft and leaves falling off plants, to say nothing of pets and small children moving through the scene. There is some work being done to put multiple sensors together too complement each other, but the combination technique is very naive (i.e. combining microwave and infrared sensors with an AND gate so as to require a positive response from both before the alarm is sounded).

The idea of security system using changes in video signal is not new. There are a number of patents which use this idea, but which are less effective than the current invention for a variety of reasons.

There has in fact been an obvious progression in the sophistication of video motion detectors designed for security systems. In the older patents, the current video image is compared with the last video image, and if any pixels have changed intensity by more than a specified threshold, the alarm is sounded. These systems have the obvious advantage of simplicity, but are severely lacking in their ability to avoid false alarms. Lighting changes, small movements due to moving drapes or swaying trees all set off this type of video security system. In addition, these systems have no way to distinguish between significant vs. non-significant movement of animate objects through the scene. These systems can't distinguish between the movement of pets or small children in the scene and the movement of real grownup intruders. These systems also have no way of distinguishing between movement of people in sensitive areas of the scene vs. legitimately traveled areas. For instance, in an art gallery these systems would be unable to distinguish between a guard or patron walking harmlessly through a gallery and an intruder walking directly up to a valuable exhibit.

The next patent in the evolutionary line of video motion alarms sacrificed some of the simplicity of the original systems in an attempt to deal with the problem of distinguishing between movement in sensitive vs. insensitive areas of the scene. Specifically, U.S. Pat. No. 4,458,266 requires the user to specify one or more rectangles in the image, called windows, which are designated as sensitive areas. If a pixel within one of these windows changes by more than a specified threshold, the alarm is sounded. There are a number of problems with this patent from a practical standpoint. First it requires a rather sophisticated user interface and sophisticated user interaction to configure the system. It requires a way of displaying for the user an image of the scene, and providing a means (which is unspecified in the patent) for allowing the user to indicate the regions in the image which should be considered sensitive areas. Another shortcoming is that this invention is still unable to ignore overall lighting variations in the scene, since a change in the illumination across the whole scene will cause lighting changes within the sensitive windows, which will result in sounding the alarm. The same is true for small and insignificant movements within the sensitive area; a significant change in even a single pixel within a sensitive window will set off the alarm. An even more damaging shortcoming of this patent is that it doesn't even solve the real problem it tries to address. Specifically, its not movement within windows of the image which are important, its movement within areas of the scene. Suppose for instance, a sensitivity window was defined as a box around the image location of the valuable exhibit in the art gallery example discussed above. If a patron walked between the camera and the exhibit, the upper part of his body will pass through the sensitivity window and set off the alarm, despite the fact that he is nowhere near the exhibit itself.

A more recent patent is U.S. Pat. No. 4,679,077. It sacrifices a great deal more in the area of simplicity and tries to use more complex AI techniques such as object recognition and template matching to distinguish between significant and insignificant image changes. There are three stages to the processing in this system.

The first stage is designed to provide insensitivity to lighting changes by comparing the current image with a large number of reference images for different times of day and illumination levels. If the current image is significantly differences from each of the reference images, it sounds the alarm. Obviously to take care of a wide variety of situations would require a large set of reference images, and a time consuming image comparison process.

The next stage requires sophisticated user interaction. Specifically, in the second stage, for each time of day and illumination level, the user must use a light pen to trace over lines in the image which should be considered significant (like doorways, etc.). These line drawings are converted to a symbolic "list of lines" format and stored as references. When the system is running it detects edges in the scene using a Robert's operator or similar technique. It then converts the edge image into the symbolic .list of lines format, and sequentially compares the current list with each of the relevant reference lists. If the current list of lines in the image differs from each of the reference lists (i.e. if important lines are missing or obscured), then an alarm is sounded. This system will be both computationally expensive and prone to errors because of mistakes in edge detection and in converting the edge data to a symbolic format. Furthermore, if someone leaves an object like a box within the cameras field of view, a user will have to reconfigure the system because the significant permanent edges in the image will have changed.

Finally, stage 3 of the invention requires even more complex user interaction and sophisticated processing. The user is required to draw with the light pen objects (such as people) which should be considered significant and the image locations in which their occurrence should result an alarm. These line drawings are converted to the symbolic format and stored as references.

When running, the system appears to attempt object recognition by matching the reference objects with the lines extracted from the current scene. If the object is found in the current scene, and is in a location specified as a sensitive area, the alarm is sounded. Again, the difficulty of the object recognition task being attempted by this invention will severely degrade its performance.

In short, the complexity of the user interaction and processing required by this and other recent video security system seriously hinders their applicability. The computational requirements alone demand very expensive hardware, and even with the required hardware and a well trained user to configure it, the system will not perform robustly.

SUMMARY OF THE INVENTION

The present invention pertains to a security system. The security system is comprised of means for monitoring an area under surveillance. The monitoring means produces images of the area. The security system is also comprised of means for processing the images to determine whether the area is in a desired state or an undesired state. The processing means is trainable to learn the difference between desired states and the undesired states. In a preferred embodiment, the monitoring means includes a video camera which produces video images of the area and the processing means includes a computer simulating a neural network.

The present invention also pertains to a method for determining whether an area under surveillance is in a desired state or an undesired state. The method comprises the steps of collecting data in a computer about the area which defines when the area is in the desired state or the undesired state. Next, training the computer from the collected data to essentially correctly identify when the area is in the desired state or in the undesired state while the area is under surveillance. Next, performing surveillance of the area with a computer such that the computer determines whether the area is in a desired state or the undesired state.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
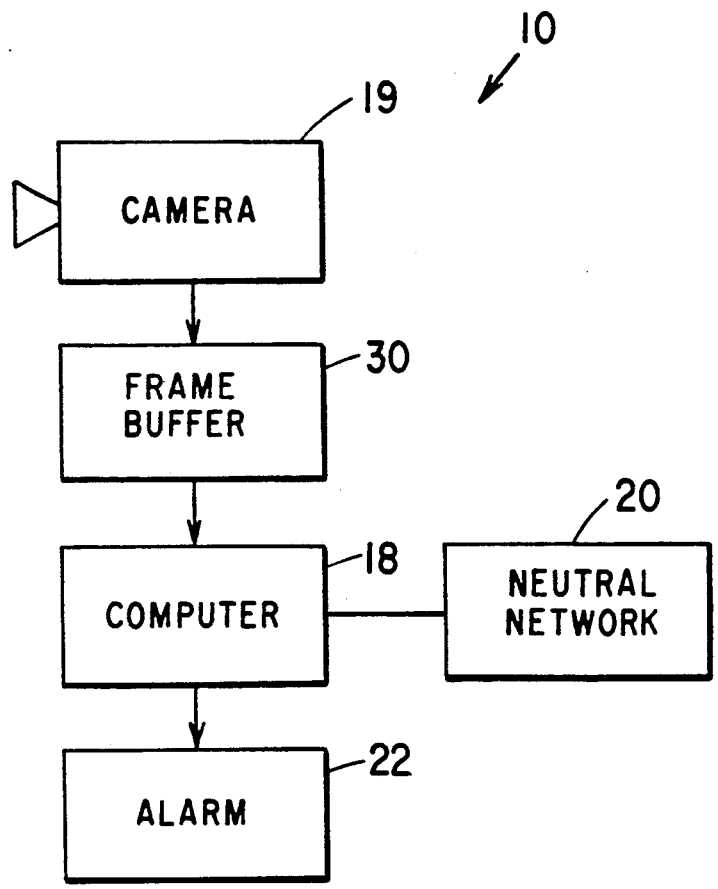
FIG. 1 is a block diagram of a security system.
Figure 2:
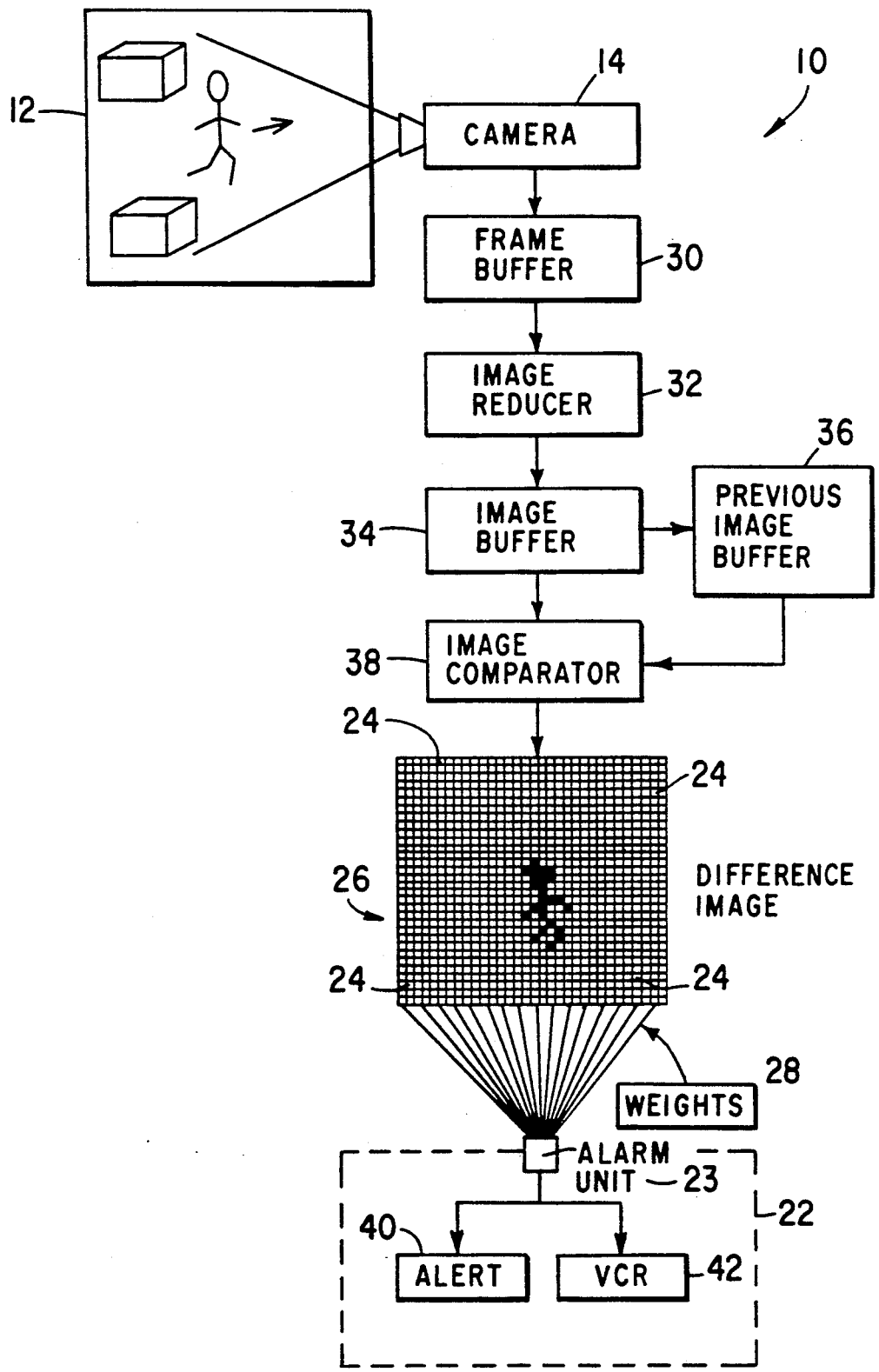
FIG. 2 is another block diagram of a security system.

Referring now to the drawings wherein like reference numerals refer to similar or identical parts throughout the several views, and more specifically to FIGS. 1 and 2 thereof, there are shown block diagrams of a security system 10. The security system 10 is comprised of means for monitoring an area 12 under surveillance. The monitoring means produces images of the area 12. The security system is also comprised of means for processing the images to determine whether the area 12 is in a desired state, for instance, no intruder in the area 12, or an undesired state, for instance, an intruder present in the area 12. The processing means is trainable to learn the difference between the desired state and the undesired state.

The monitoring means can include a single video camera 14 or, as shown in FIG. 2, be comprised of additional sensors 16. The additional sensors 16 can be video cameras 14, infrared motion detectors or microwave detectors, to name a few, or various combinations thereof.

The processing means preferably includes a computer 18 simulating a neural network 20 [Rumelhart, D. E., Hinton, G. E. & Williams, R. J. (1986). Learning internal representations by error propagation. In D.E. Rumelhart & J. L. McClelland (Eds.) *Parallel Distributed Processing: Explorations in the microstructures of cognition. Volume 1: Foundations.* Cambridge, MA: Bradford Books/MIT Press. Pg. 318–362.]The security system 10 can also include an alarm 22 which is triggered by the computer 18 when an undesired state is determined to exist in the area 12.

Preferably, the image of the area 12 formed from video camera 14 and additional sensor 16, if any, is comprised of pixels 24. When there is only a video camera 14 present, then each pixel 24 has a value corresponding to the amount of light associated with the pixel 24. The computer 18 compares the values of pixel 24 of a most recent image of the area 12 with the values of pixel 24 of at least one earlier in time image of the area 12 to produce a difference image 26 comprised of pixels 24. Each of the pixels 24 in the difference image 26 have a value corresponding to the difference in values between corresponding pixels 24 of the most recent image and the earlier in time image. The neural network 20 of the computer 18 has weights 28 for each pixel 24 which are multiplied by the respective pixel 24 value of the difference image then added together to form a sum. The sum, if greater than a predetermined amount, results in the computer 18 triggering the alarm 22.

In the event the monitoring means includes additional sensors 16, together with the video camera 14, the image of the area 12 is produced. The value of each of the pixels 24 of the image then has a component corresponding to the additional sensors 16 as well as a component corresponding to the amount of light associated with the pixel 24.

In a preferred embodiment, the security system 10 consists essentially of four components, a video camera 14 for monitoring an area, a frame buffer 30 for storing images, a computer 18 for processing the images and an alarm 22 (See FIG. 1). Configuring and using the security system 10 is a three step process consisting of a data collection step, a training step, and a performance step. A description of each step follows.

Referring to the performance step before looking at the other two steps, the components of the security system 10, including the important algorithmic processes involved in the performance step, are illustrated in FIG. 2. The video camera 14 is positioned to view the area 12 to be kept secure. The camera 14 sends a video image to the frame buffer 30 which in turn sends the image through the image reducer 32 to create a lower resolution image (45×48 pixels). The reduced image is stored in an image buffer 34. The reduced image and the previous reduced image are taken from the image buffer 34 and previous image buffer 36, respectively, by the image comparator 38 which creates a difference image 26 by taking the absolute value of the difference between the two images on a pixel-by-pixel basis. See U.S. Pat. No. 4,458,266 for a more complete discussion concerning the operation of the above mentioned components of the performing step.

The difference image 26 is presented as input to an artificial neural network 20 with one output unit 23 being part of the alarm 22. The network 20 has a single layer of connections between the input retina of the network 20 and the alarm unit 23. The weight of a connection from a pixel 24 to the alarm unit 23 corresponds to how much and in what direction a given change in that pixel 24 should influence the decision to sound the alert 40 of the alarm 22. To determine the input to the alarm 22, the values of pixels 24 in the difference image 26 are multiplied by the weights of the corresponding connections and summed. If the sum is greater than a predetermined threshold, the alert 40 is sounded to notify the user of an intruder and a VCR 42 of the alarm 22 is activated to record the scene.

It is in the data collection and training step that the system learns to distinguish between situations in which it should and should not sound the alarm. During data collection, the user provides the security system 10 with examples of situations when the alert 40 of the alarm 22 should and should not be sounded. In practice, this is done by literally acting out scenarios which illustrate changes in the image that require and do not require responses from the security system 10. As a sample example, consider training the security system 10 to respond to a person entering the camera's 14 field of view, and ignore lighting changes.

The system 10 first asks for situations when the security system 10 should set off the alert 40. During this time, the person walks around in front of the camera 14 to simulate an intruder while the security system 10 creates difference images 26 as described above. These difference images 26, along with an indication that the alarm unit 23 should be active on them, are saved in the computer 18 for the training step. The security system 10 then asks for examples of situations when the alert 40 should not be sounded. During this time, the person provides examples of lighting changes which should not set the alert 40 off for instance by turning on and off lights, and opening and closing window shades which alter the light entering the room. In addition, the person provides the security system 10 views of the scene not changing, since in these situations the alert 40 should also not be sounded. The security system 10 again creates the difference images 26 described above and stores them in the computer 18 with an indication that the alarm unit 23 should be off in these situations.

In the training step, the weights in the network 20 are altered using the backpropagation neural network training algorithm (see Rumelhart et al.) so as to activate the alarm unit 23 in the correct circumstances. The training involves repeatedly presenting the stored examples and incrementally altering the weights 28 in the network 20 so as to activate the alarm unit 23 only in situations that require sounding the alarm 22. When simulating the network 20 on a Sun-4 TM computer 18, it takes about 5 minutes to collect the training images, another 5 minutes to train the network 20, at which time the security system 10 is ready to perform as described in the performance step.

There is an additional capability of the security system 10. The security system 10 has the ability to refine its performance. Specifically, during the performance step, when the security system 10 sounds the alert 40, it not only stores a user viewable image of the scene that triggered it in the computer 18, but it also stores the difference image that activated the alarm unit. If the system is performing poorly, particularly if it is sounding false alarms because some no-alarm situation was mistakenly excluded from the training set of examples, the user can add this new no-alarm change image to the set of training examples and further train the security system 10 to ignore it. This feature is particularly helpful for rare no-alarm situations, and for no-alarm situations that are hard for the user to reproduce.

Figure 3:
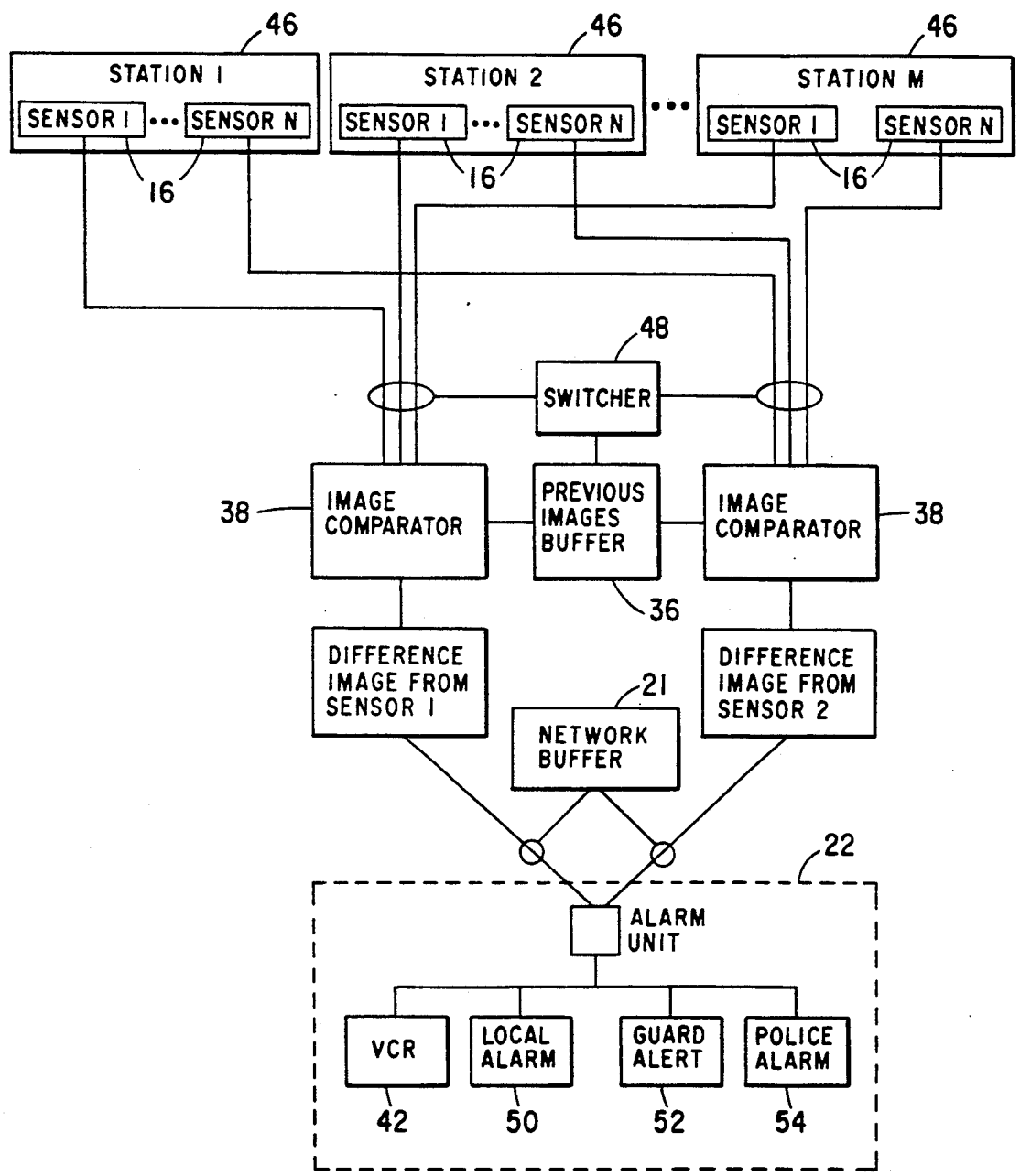
FIG. 3 is a block diagram of an alternative embodiment of a security system.

Besides a video camera 14, additional sensors 16, including microwave and passive infrared (PIR) motion detector technology can be used, as shown in FIG. 3. Difference images 26 like that described above for the video data are created for these additional sensors 16 and provided to the network 20 as additional inputs. The backpropagation training algorithm configures the weights so as to integrate the multi-sensor input and determine the circumstances in which to sound the alert 40. An infrared sensor could be used in very dark circumstances to insure that the network 20 does not miss intruders.

Another embodiment would include the ability for a single computer 18 to service multiple sensor stations 46. For example, suppose a company already had a number of video cameras 14 stationed throughout its premises for monitoring at a central location by a security guard. The addition of a switcher 48 to is required in this embodiment to (1) channel a particular camera's signal into the computer 18, and 2) signal the computer 18 to use the weights 24 in a network buffer 21 trained for the current camera's scene.

The system need not have only a single output response. Instead, the network 20 can have a number of output units, each corresponding to a different action. Four possibilities, for instance, are (1) a VCR 42 for recording the intruder, (2) a local audible alarm 50 for scaring the intruder, (3) a guard alert 52 signal that notifies the on-site security guard of the intrusion and (4) a police alarm 54 for summoning the authorities.

The security system 10 could be trained to make a particular response to particular image changes. For instance, a person entering through a door might be a late night worker or a security guard, so this situation should only elicit an alert for the security guard to take a look at his monitor to verify that the person has legitimate business being in the area. Conversely, someone entering through a window is in all likelihood a serious security breach and should therefore result in all four alarms going off. Besides ease of use, the trainability of the network 20 also makes the security system 10 refinable. If the user finds after training the system it still is susceptible to false alarms in certain situations, the user can provide further training examples to correct the system's behavior without sacrificing sensitivity to actual intrusion. The security system 10 can even store the images which sounded the alarm 22 for later incorporation into the training set, allowing for the correction of false alarms resulting from rare or difficult to reproduce situations. Of course, under certain circumstances a network 20 already trained and ready for use can be supplied to a user. For instance, a network 20 pretrained to ignore certain lighting variations and to only respond to adults moving in the scene could be provided. This would be helpful for those users who don't want to customize their own network 20. These pretrained networks 20 could also be a starting point for individual customizations. The user could try out a pretrained . network 20 for the application and if it doesn't work quite as desired the user could refine the pretrained network 20 as described above without much effort.

In addition, to ease of use and refinement, the neural network 20 basis for the security system 10 results in very simple processing. Once trained, the security system 10 requires only a few operations per pixel in the low resolution image to determine the system's response. This computational simplicity means a marketable security system 10 will require only a PC-class processor 18 to achieve real time performance. Training the network 20 is somewhat more computationally expensive. But the training step does not require real time performance, and a PC-based embodiments of the security system 10 should require on the order of one hour of unsupervised processing to train.

Another attribute of the security system 10 is the ability to integrate it into existing surveillance systems. With relatively simple switching technology, it should be possible to have a single central computer 18 service the many remote cameras 14 of currently installed closed-circuit surveillance systems. However, unlike previous systems, this security system 10 is not wedded to video input as the sole sensor. Previous systems required users to interact through a graphic interface to define the system's responses. This graphic interaction required the use of video images since they are easy for people to understand. Because the security system doesn't require direct interaction between the user and the sensor signal, infrared motion detectors and other sensor technologies can be used as input to the security system 10 despite the fact that the user may have no idea how an intruder would alter the signal coming from one of these alternative sensors. In other words, since the user merely provides the security system 10 with actual situations and the corresponding correct responses, and the network takes care of learning to discriminate changes in the sensor signal that should elicit an alarm, the security system 10 is capable of employing a variety of sensor technologies and integrating their signals appropriately.

The security system 10 has been successfully trained to discriminate between small and large moving objects in a scene. This type of discrimination has application in both indoor and outdoor security. Indoors, this ability is ideal for preventing false alarms resulting from pets or small children accidently crossing the sensors field of view. Outdoors, the same discrimination ability could be used to ignore the movements of animals and leaves while remaining sensitive to the movement of large intruders like people and cars. Notice that this type of discrimination is impossible to duplicate with a simple sensitivity setting, since the movement of a small object at the bottom of the image in the vicinity of the sensor will result in the same amount of image change as a large object moving at the top of the image far away from the sensor. The network can learn to combine the location and the size of the image change to determine when to sound the alarm 22.

The security system 10 has also been trained to discriminate between lighting variations and actual movement in the scene. The security system 10 is able to react when a person moves into the scene, but to ignore scene changes resulting from both overall brightness changes and local image changes resulting from shadows and sunlight shining through windows.

The security system 10 has been trained to respond to movement in sensitive areas of the scene (not sensitive windows in the image). Specifically, the security system 10 can learn to discriminate between a person moving into a sensitive location in the scene and a person moving between the camera and the sensitive location. This capability is also crucial for outdoor security applications where it is necessary to ignore swaying trees and movement on the other side of a security fence.

The security system 10 has also been taught to discriminate movement along a particular trajectory in the scene. This could be applied to prevent sounding of the alarm if a security guard walks by a window, but to allow sounding of the alarm if an intruder enters through the window. Outdoors, this trajectory sensitivity could be used to alert a guard when a would be intruder moves purposefully along a fence's perimeter, but to ignore other types of movement like the swaying of a tree just outside the fence.

Obviously, the individual discrimination capabilities described above can be combined to produce other desired behavior. For instance, network 20 has been trained to ignore lighting variations and only respond to movement in a particular area of the scene, and another network 20 has been trained to ignore lighting variations and the movement of small objects in the scene.

To ready the security system 10 for operation, the data collection step, the training step and the testing step are usually undertaken. It should be noted though that in a pretrained network the data collection steps and the training step are unnecessary. In addition, a refinement step and a nuisance elimination step can also be undertaken.

In the testing step, there is included first the step of digitizing the image of the scene. Next, there is the step of pre-processing the digitized image. The pre-processing step can include the steps of first reducing the image to a low resolution black and white image. Then, there is the step of finding a change in the pixel 24 values between a latest digitized image and a previous, preferably the last, digitized image of the scene. Then, there is the step of normalizing each pixel 24 by brightness with respect to the pixel 24's value to determine the percentage change in the pixel 24's value. Next, there is the step of enhancing the spacial coherence for each pixel 24. This is done by adding up the percentage changes in the pixel 24 within a given vicinity in the digitized image and then multiplying the pixel 24's value by this sum and a user defined constant. Each pixel 24's value is limited to be between 0.0 and 1.0.

After the pre-processing step, there is the forward propagation step to determine the network's output. The forward propagation step involves multiplying the value of each pixel 24 by its corresponding weight and then adding all these values together to form a sum. This real valued sum is then squashed down to keep its range between 0.0 and 1.0 using the sigmoid function (result = $1/(1+e^{-sum})$). The resulting value is called the alarm unit's activation level.

In the next step, called the decision step, the decision whether to sound the alert 40 is made. The alert 40 is only sounded if the activation level of the output unit 23 exceeds a user defined threshold more than once in a user defined number of cycles. In this way, spurious alarms can be avoided.

Next, there is the step of waiting for a user defined delay time. This concludes a single cycle of the testing step. The testing step is repeated until the user says to stop in order to continuously monitor the scene.

In the data collection step, first there is the step of presenting to the system situations which should elicit an alarm. This is done by performing the steps of digitizing the image and processing the image from the testing step, saving the difference image formed and along with an indicator value of 1.0 to indicate that an alarm should sound when that situation appears. The next step of the collection step is for a user to provide the step of presenting situations to the network 20 which should not elicit an alarm. This is similarly accomplished by performing the digitizing and processing steps from the testing step, saving the difference image formed and along with an indicator value of 0.0 to indicate that the alarm should not sound.

During the training step, the weights of the network 20 are repeatedly altered until the network 20 is making fewer than a user defined number of mistakes on the difference images stored in the collection step, or until the user indicates to stop. The network is considered to be making a mistake on a difference image if, after performing the forward propagation stage as described earlier, the resulting activation level of the alarm unit 23 differs from the correct output activation level for that difference image 26 (1.0 if the alarm should be sounded for the image, 0.0 if the alarm should not be sounded for the image) by more than a user defined amount.

If the resulting activation level of the alarm unit 23 is greater than the correct activation level for this difference image 26, then the initially random weights 28 of the connections from the pixel 24 to the output unit are decreased so that next time the network 20 is presented with this particular difference image 26, the activation level of the alarm unit 23 after the forward propagation step will be closer to the correct output activation level. If the resulting activation level is less than the correction activation level for this difference image 26, then the weights 28 of the connections from the pixel 24 to the output unit are increased so that next time the network 20 is presented with this particular difference image 26, the output activation level of the alarm unit 23 after the forward propagation step will be closer to the correct output activation level. The actual change to each weight 28, as specified in Rumelhart et al., is given by the following equation.

weight_change = (user_defined_constant1 * output_act_level *

(1 − output_act_level) * (correct_output_act_level − output_act_level) * corresponding_pixel_value) + user_defined_constant2 * last_weight_change

By repeatedly applying this weight alteration strategy, the weights 28 in the network 20 evolve so as to produce the correct activation level for the alarm unit 23 for the stored difference images 26. In other words, this scheme allows an initially random network 20 to learn to produce an appropriate response when presented with user specified situations.

In the refinement step, there is first the step of performing the testing step for a user defined number of iterations while presenting the network 20 with situations which should elicit an alarm. For each of these iterations, whenever the network 20 fails to sound the alarm the corresponding pixel 24 image is saved, along with a value of 1.0 indicating that the alarm should be sounded in such a situation. Then there is the step of performing the testing step for a user defined number of iterations while presenting the network 20 with situations which should not elicit an alarm. For each of these iterations in which the network 20 sounds the alarm, the corresponding pixel 24 image is saved along with a value of 0.0 to indicate the alarm should not be sounded. Then, there is the step of adding these error examples to examples which were collected in the collections step. The training step can then be implemented again with the new expanded set of examples to refine the weights 28.

Finally, there is the nuisance elimination step. Under this step, for each pixel 24 image collected during the testing step due to an alarm sounding, the user is shown the corresponding digitized image and asked whether it was a valid alarm or not. If the corresponding digitized image is not one in which the alarm should be sounded, the corresponding difference image 26 is stored with a value of 0.0 to indicate that the alarm should not be sounded. These additional collected error examples are then added to the examples collected in the collection step and the refinement step. The training step can then be continued with the new expanded set of examples to refine the weights 28 and continue repeating the above steps to ensure that ultimately, there will never be any false alarms and there are only correct alarms.

Figure 4:
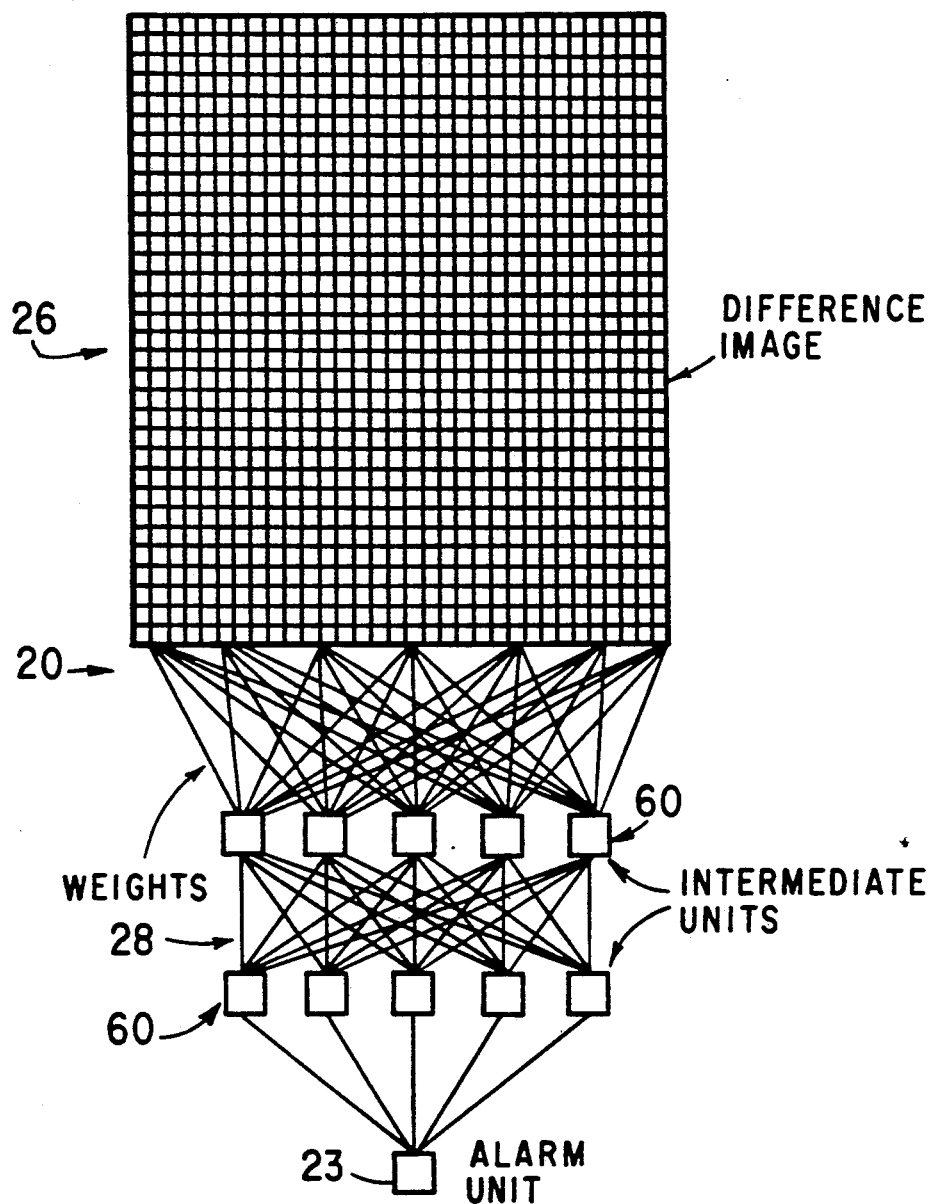
FIG. 4 is a block diagram of another embodiment of a multi-layer neural network.

Another embodiment of the network 20 includes multiple layers of intermediate units 60 and weights 28 between the difference image and the alarm unit 23, as illustrated in figure 4.

Instead of a single layer of weights 28 connecting pixels in the difference image 26 to the alarm unit 23, this embodiment allows pixels in the difference image 26 to be connected to intermediate units 60 which act as detectors for particular simple features in the difference image 26 such as changes occurring at a particular locations in the image. These simple feature detector units 60 have weights 28 to units in subsequent layers which combine the simple feature detectors into detectors for more complex features such as the moving objects shape and speed. Finally, these complex feature detectors can be combined through connections to the alarm unit(s) 23 which are thresholded to determine whether an alarm should be sounded.

The back-propagation algorithm, as described in Rumelhart et al., and as illustrated in the accompanying source code, provides a means by which the weights 28 in this more complex network 20 can be trained to produce the desired response in the alarm units 23 for particular kinds of image changes. More specifically, the back-propagation algorithm provides a means for developing detectors for features in the image which are important for discriminating between alarm and no-alarm conditions, and for combining those features to produce the correct response in the alarm units 23.

As an example of how the back-propagation algorithm works to produce the correct weights 28, and how a trained system 10 operates, consider the following example in which the network 20 with a single layer is trained to respond to movement in a particular portion of a room (perhaps in the vicinity of a valuable art exhibit), and to ignore changes resulting from lighting variations and movement in other locations. The camera 14 is positioned so the exhibit will occupy a discernible area 62 in the difference image (see Figures). During the collection step, difference images 26 which illustrate situations in which the alarm 22 should be sounded are made by having a person walk in the vicinity of the exhibit. The resulting movement in the vicinity of the exhibit, through the preprocessing described above, causes pixels 24 within the area 62 to have positive values in the difference image 26. During the training step, the back-propagation algorithm recognizes that there is a correlation between the pixels 24 within this boxed area 62 having a positive value and the alarm unit 23 being on. More specifically, the frequent co-occurrance of these two situations in the training images results in the back-propagation algorithm assigning large positive weights to the connections between the pixels 24 within the box and area 62 and the alarm unit 23 during the training step. The pixels 24 with a positive weight to the alarm unit 23 are colored white in FIG. 5.

During the testing step, when someone moves into the vicinity of the exhibit, the pixels 24 of the difference image 26 in the area 62 surrounding the exhibit in the image will again take on a positive value. These positive pixel values are multiplied by the positive weights 26 between these pixels 24 and the alarm unit 23. The positive resulting products will be added together and provided as the input to the alarm unit 23. After applying the sigmoid function to this positive net input, the resulting activation level of the alarm unit 23 will be greater than its threshold, and hence the alarm will be sounded. In this way, the network 20 is trained using the back-propagation algorithm so as to produce an alarm response when there is movement in a particular area of the scene.

In contrast, movement in other areas of the scene, outside the immediate vicinity of the exhibit, will result in pixels 24 outside area 62 being turned on in the difference image 26. On these occasions, when pixels 24 outside area 62 are turned on, the alarm unit 23 will should be turned off, since there is no movement near the sensitive exhibit. Therefore, there will be an inverse correlation between the correlation between the activation levels of pixles 24 outside the sensitive area and the alarm unit. The inverse correlation will cause the back-propagation algorithm to assign negative weights to the connections between pixels 24 outside the boxed area 62 and the alarm unit 23, as illustrated by the grey pixels 24 in FIG. 5.

During the testing step, when there is movement in the image away from the exhibit, the positive values in the corresponding pixels 24 will be multiplied by the negative weights 38 from those pixels 24 to the alarm unit 23. The resulting negative product will keep the activation level of the alarm unit 23 low, preventing it from sounding a false alarm in harmless situations when someone is moving in the image, but not in the vicinity of the exhibit.

Figure 5:
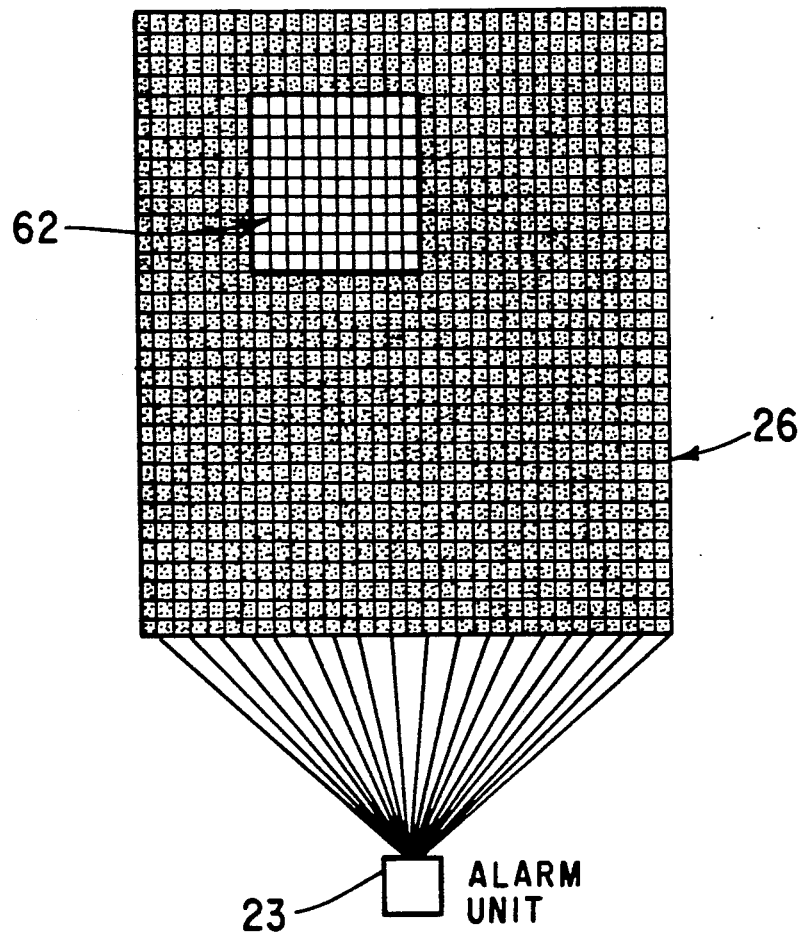
FIG. 5 is a block diagram of a difference image connected to an alarm unit.

In situations in which there is a significant lighting change across the whole image, pixels 24 both inside and outside of the boxed area 62 in FIG. 5 will have positive values in the difference image 26. In the training images collected during the collection step, such uniform image-wide changes will be associated with an inactive alarm unit 23, since in such situations the alarm should not be sounded. To insure that during testing the alarm unit 23 remains inactive, the back-propagation algorithm configures the weights 28 to the alarm unit 23 in such a way that negative input to the alarm unit 23 from the pixels 24 outside of the sensitive area 62 is greater in magntiude than the positive input from the pixels 24 inside area 62 in the vicinity of the exhibit. Therefore, during testing, when faced with image-wide changes resulting from a change in lighting conditions, the negative net input the alarm unit 23 will keep its activation level low and prevent the alarm from being sounded.

This has been a specific explanation of how the system 10 can be trained to perform one simple kind of discrimination by showing it examples of situations in which it should and should not respond. Other types of discriminations it can learn to perform are discussed above.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims after the Appendix.

```
/* globals.h -- globals for SENTRY program */

/* created 1/26/90 */ include "constants.h"

include <stdio.h>
include <gimage.h>
#include <interface.h>
#include <tools.h>
#include <cmath.h>

IMAGESEQ    *i_imageseq, *i_seqmopen();
IMAGE *dis, *video_image, *small_image, *big_image, *pp_video_display;

float unnormalized_bw_image[IMAGE_ROWS][IMAGE_COLS];
float bw_output_image[IMAGE_ROWS][IMAGE_COLS];

int sample_offset[IMAGE_ROWS][IMAGE_COLS][MAX_NUM_TO_SAMPLE];

/* globals for network */ int n_units;
int n_conns;

struct   unit_type    unit[MAX_UNITS];
struct   conn_type    conn[MAX_CONNS];

/* which units are the inputs and outputs? */
int      input_index[MAX_INPUTS];
int      hidden_index[MAX_HIDDENS];
int      output_index[MAX_OUTPUTS];
```

```
int    yoking_flag;

float sigmoid_table[20000];

FILE *dumpfp;

/* the values for following variables are stored in the file PARAM_FILE */ int    mode_flag;            /* 0 means data collection mode,
                                1 means refinement mode,
                                2 means test mode */
char display_device[100];    /* name of display */
int    camera;               /* camera to use */
int    alarm_type;           /* 0 means flash, 1 means honk */
float percent_to_sample;     /* 0.0 to 1.0 */
int    alarm_type;           /* 0 means flash screen,
                                1 means honk horn */
char   root[100];            /* place to get network from */
float decay_factor;          /* what percent of difference image from last time
                                to use again this time */
float coherence_enhancement_factor;/* what to multiply sum of nearby pixels by to get
                                scale factor for current pixel */
int    mask_size;            /* size of mask for coherence enhancement */
int    using_sensitive_time; /* 1 means use a 2 stage test for sounding alarm,
                                you must have tried to sound it recently, and
                                being trying to sound it on this image */
int    num_sensitive_images; /* how many images to stay sensitive for after trying
                                to sound alarm */
float sensitivity_threshold; /* if using sensitive time, the threshold which
                                should reset your sensitivity counter */
float alarm_threshold;       /* threshold above which to sound alarm, (if using
                                sensitive time, you must have tried to fire alarm
                                recently also */
float test_delay;            /* time to wait (in secs) between interations during
                                testing*/
float collect_delay;         /* time to wait (in secs) between interations during
                                collection */
int    refining;             /* 1 means we are refining weights, so dump
                                exemplar to disk */
char exemplar_file_name[100];   /* file to write to */
int    dumping_images;       /* 1 means save images on which alarm was sounded
                                to disk */
char image_file_name[100];   /* file to write to */ int    num_neg_exemplars;    /* when in collection mode, how many no alarm
                                exemplars to collect */
int    num_pos_exemplars;    /* when in collection mode, how many alarm
                                exemplars to collect */ int    num_neg_test_exemplars;  /* when in refine mode, how many no alarm
                                exemplars to test for possible collection */
int    max_neg_test_to_dump;    /* max number of negative examples to dump during
                                in refinement mode */
int    num_pos_test_exemplars;  /* when in collection mode, how many alarm
                                exemplars to test for possible collection */
int    max_pos_test_to_dump;    /* max number of positive examples to dump during
                                in refinement mode */
int    display_acts;         /* 1 means display activation levels */
#include "constants.h"
#include "structures.h"
#include "globals.h"

/*********************************************************************
  init_alarm
 *********************************************************************/
init_alarm() { if ((alarm_type == 1) ||
      (mode_flag == 0) ||
      (mode_flag == 1))
    Cnt_Init("cleo", "Sentry");
}

/*********************************************************************
  honk
 *********************************************************************/
```

```
honk() { req_set_honk(2, 1, 1);
}

/**************************************************************
flash
**************************************************************/
flash() { unsigned char white[3];
  unsigned char black[3];
  static int cycle = 1;

white[0] = white[1] = white[2] = 255;
  black[0] = black[1] = black[2] = 0;
  if ((cycle++ % 2) == 0) {
    /* black out horizontal line */
    i_mcfillbox(dis,
        125,
        175,
        300,
        400,
        black);
    /* vertical line */
    i_mcfillbox(dis,
        100,
        200,
        325,
        375,
        white);
  }
  else {
    /* black out vertical line */
    i_mcfillbox(dis,
        100,
        200,
        325,
        375,
        black);
    /* horizontal line */
    i_mcfillbox(dis,
        125,
        175,
        300,
        400,
        white);
  }
}

/**************************************************************
sound_alarm
**************************************************************/
sound_alarm() { if (alarm_type == 0)
    flash();
  else if (alarm_type == 1)
    honk();
}

/**************************************************************
dump_exemplar
**************************************************************/
dump_exemplar(response)
    float response;
{
  int size = IMAGE_ROWS * IMAGE_COLS + 1 + 1;
  int row, col;
  int i = 1;
  float exemplar_buf[IMAGE_ROWS * IMAGE_COLS + 1 + 1];

exemplar_buf[0] = 1.0; /* bias unit */
  for (row = 0; row < IMAGE_ROWS; row++)
```

```
   for (col = 0; col < IMAGE_COLS; col++)
      exemplar_buf[i++] = bw_output_image[row][col];

exemplar_buf[i] = response; /* set output unit */ fwrite(exemplar_buf, sizeof(float), size, dumpfp);
}

/*************************************************************
test_for_alarm
*************************************************************/
int test_for_alarm() { int output_unit = output_index[0];
   static int sensitivity_timer = 0;

if (using_sensitive_time && (!sensitivity_timer)) {
      if (unit[output_unit].output[0] > sensitivity_threshold)
         sensitivity_timer = num_sensitive_images;
   }
   else {
      if (using_sensitive_time)
         sensitivity_timer--;
      if (unit[output_unit].output[0] > alarm_threshold) {
         sensitivity_timer = num_sensitive_images;
         return(1);
      }
      else
         return(0);
   }
}
include <stdio.h>
include <math.h>
#include "constants.h"
#include "structures.h"
#include "globals.h"

/*************************************************************
load_test_pattern
*************************************************************/
load_test_pattern() { register int row;
   register int col;
   register int cur_unit = 1;

/* put input units into unit array after the last normal pattern */
   for (row = 0; row < IMAGE_ROWS; row++)
      for (col = 0; col < IMAGE_COLS; col++)
         unit[input_index[cur_unit++]].output[0] = bw_output_image[row][col];

/* Put in true unit */
   unit[input_index[0]].output[0] = 1.0;
}

/*************************************************************
sweep_forward
*************************************************************/
void sweep_forward(start, end)
   int start, end;
{
   /* compute units' activations */ struct conn_type *c;
   struct unit_type *u, *v;
   struct conn_type *clim;
   struct unit_type *ulim;
   int i,j;
   int index;
   register int pat;
   register int start_pat = start;
   register int end_pat = end;
```

```c
for (u = unit,ulim=unit+n_units; u < ulim; u++) {
  if (u->flavor == 1) /* if input unit */
    u->flag = 0;
  else {
    for (pat = start_pat; pat < end_pat; pat++)
      u->output[pat] = 0.0;       /* clear accumulators */
    u->flag = 1;                  /* flag output as needing to be computed */
  }
} for (c = conn,clim=conn+n_conns; c < clim; c++) {
  u = c->from;
  v = c->to;
  if (u->flag) {  /* compute activation the first time it is needed */
    for (pat = start_pat; pat < end_pat; pat++)
      u->output[pat] = SIGMOID(u->output[pat], index); /* SIGMOID is in constants.h */
    u->flag = 0;
  }
  for (pat = start_pat; pat < end_pat; pat++)
    v->output[pat] += c->weight * u->output[pat];  /* propagate forward across link */
} for (j = 0; j < n_outputs; j++) { /* compute output units' activations*/
  i = output_index[j];
  for (pat = start_pat; pat < end_pat; pat++)
    unit[i].output[pat] = SIGMOID (unit[i].output[pat], index);
}
} include <sys/ioctl.h>
include "vipreg.h"
#include "constants.h"
#include "structures.h"
#include "globals.h"

#define IM_vip_mem(board, addr)    IM_vip_base[board][addr]
struct IMS_matrox
{ int rgb;                                   /* If true, RGB else 1 board */
  int board0, board1, board2, roffset, coffset;
  unsigned char *base0, *base1, *base2;      /* Board address bases */
  int vip;                                   /* True if VIP-1024, else MIP-512 */
/*
 * toggle: True if automatic toggle mode.
 * modetime: True if this image has timer service enabled.
 * current_quadrant: Currently visible quadrant of VIP.
 * current_direction: +1 or -1; for changing auto toggle.
 * togglemode: Selects type of toggling. 4 or 16 image at present.
 * current_subquadrant: Currently visible 16th of VIP.
 */
  int toggle, modetime, current_quadrant, current_direction;
  int togglemode, current_subquadrant;
};

extern unsigned char *IM_matrox_base[];

/*************************************************************************
 get_image
 *************************************************************************/
get_image() { register int row, col;
  unsigned char pixel[3];
  struct IMS_matrox *b = (struct IMS_matrox *) (dis->IM_block);
  register unsigned char *base0, *base1, *base2;
  register int sum;
  register int *offset_pointer, *end_offset_pointer;
  register int offset;
  int num_samples = MAG_FACTOR * MAG_FACTOR * percent_to_sample;
  register float divisor = 3.0 * num_samples * 255.0;

base0 = b->base0;
  base1 = b->base1;
  base2 = b->base2;

vip_dig(camera);

I_mcgetpixel(dis, 0, 0, pixel); /* to prevent GIL timeout */
```

```
for (row = 0; row < IMAGE_ROWS; row++)
 for (col = 0; col < IMAGE_COLS; col++) {
  sum = 0;
  end_offset_pointer = &sample_offset[row][col][num_samples];
  for (offset_pointer = &sample_offset[row][col][0];
       offset_pointer < end_offset_pointer;
       offset_pointer++) {
   offset = *offset_pointer;
   sum += base0[offset] + base1[offset] + base2[offset];
  }
  unnormalized_bw_image[row][col] = (float)sum / divisor;
 }
}

/***************************************************************
dump_image
***************************************************************/
dump_image() {

IMAGE *image;

/* output image */
 image = i_seqnext(i_imageseq, 0, NULL, NULL);
 i_copy(image, video_image, 0, NULL);
 i_close(image, NULL);
}
#include "constants.h"
#include "structures.h"
#include "globals.h"

/***************************************************************
init_vars
***************************************************************/
init_vars() { interface_struct *inter;

/* get flags and stuff from file */ inter = open_interface(PARAM_FILE);

read_int_parameter(inter, 0, 2, "mode_flag", &mode_flag);
 read_string_parameter(inter, "display_device", display_device);
 read_int_parameter(inter, 0, 4, "camera", &camera);
 read_int_parameter(inter, 0, 1, "alarm_type", &alarm_type);
 read_float_parameter(inter, 0.0, 1.0, "percent_to_sample", &percent_to_sample);
 read_string_parameter(inter, "root_filename", root);
 read_float_parameter(inter, 0.0, 1.0, "decay_factor", &decay_factor);
 read_float_parameter(inter, 0.0, 10.0, "coherence_enhancement_factor",
        &coherence_enhancement_factor);
 read_int_parameter(inter, 0, 10, "mask_size", &mask_size);
 read_bool_parameter(inter, "using_sensitive_time", &using_sensitive_time);
 read_int_parameter(inter, 0, 100, "num_sensitive_images", &num_sensitive_images);
 read_float_parameter(inter, 0.0, 1.0, "sensitivity_threshold", &sensitivity_threshold);
 read_float_parameter(inter, 0.0, 1.0, "alarm_threshold", &alarm_threshold);
 read_float_parameter(inter, 0.0, 10000000.0, "test_delay", &test_delay);
 read_float_parameter(inter, 0.0, 10000000.0, "collect_delay", &collect_delay);
 read_int_parameter(inter, 0, 4, "refining", &refining);
 read_string_parameter(inter, "exemplar_file_name", exemplar_file_name);
 read_int_parameter(inter, 0, 4, "dumping_images", &dumping_images);
 read_string_parameter(inter, "image_file_name", image_file_name);

read_int_parameter(inter, 0, 1000, "num_neg_exemplars", &num_neg_exemplars);
 read_int_parameter(inter, 0, 1000, "num_pos_exemplars", &num_pos_exemplars);

read_int_parameter(inter, 0, 1000, "num_neg_test_exemplars", &num_neg_test_exemplars);
 read_int_parameter(inter, 0, 1000, "max_neg_test_to_dump", &max_neg_test_to_dump);
 read_int_parameter(inter, 0, 1000, "num_pos_test_exemplars", &num_pos_test_exemplars);
 read_int_parameter(inter, 0, 1000, "max_pos_test_to_dump", &max_pos_test_to_dump);
 read_bool_parameter(inter, "display_acts", &display_acts);

}
include <sys/ioctl.h>
include "vipreg.h"
#include "signal.h"
#include "constants.h"
```

```
#include "structures.h"
#include "globals.h"

#define my_crop_shift(img, rs, re, cs, ce)\
  i_shift(i_crop(i_dup(img, NULL),\
         si_subimage(rs, re, cs, ce, NULL), NULL),\
     0, 0, NULL)

/********************************************************************
init_samples
********************************************************************/
init_samples() { register int image_row, image_col;
  register int base_row, base_col;
  register int row, col;
  register int num_samples = MAG_FACTOR * MAG_FACTOR * percent_to_sample;
  int sample;

for (image_row = 0; image_row < IMAGE_ROWS; image_row++)
    for (image_col = 0; image_col < IMAGE_COLS; image_col++) {
      base_row = image_row * MAG_FACTOR;
      base_col = image_col * MAG_FACTOR;
      for (sample = 0; sample < num_samples; sample++) {
        row = base_row + RAND_INT(0, MAG_FACTOR);
        col = base_col + RAND_INT(0, MAG_FACTOR);
        sample_offset[image_row][image_col][sample] = VIP_POINT(row, col);
      }
    }
}

/********************************************************************
init_image
********************************************************************/
init_image() {

SUBIMAGE bounds, small_bounds;
  int mag_factor;

dis = i_mopen(display_device, IM_COLOR, IM_MODIFY, NULL);

/* give a chance to adjust camera */
  i_digitize(dis, camera, 1, NULL);
  i_clrimg(dis);

#ifdef ANDROX
  small_image = my_crop_shift(dis, 0, IMAGE_ROWS - 1,
                  0, IMAGE_COLS - 1);
endif video_image = my_crop_shift(dis, 0, INPUT_IMAGE_HEIGHT - 1,
                  0, INPUT_IMAGE_WIDTH - 1);

bounds.rs = bounds.cs = 0;
  bounds.re = INPUT_IMAGE_HEIGHT - 1;
  bounds.ce = INPUT_IMAGE_WIDTH - 1;

i_imageseq = i_mseqcreat(image_file_name,
              IM_COLOR,
              IM_UNSIGNED,
              8,
              bounds,
              NULL);

init_samples();

small_bounds.rs = small_bounds.cs = 0;
  small_bounds.re = IMAGE_ROWS - 1;
  small_bounds.ce = IMAGE_COLS - 1;
  small_image = i_temp(IM_UNSIGNED, 8, small_bounds, NULL);
  mag_factor = (int)(FLOOR(256.0 / IMAGE_COLS));
  big_image = i_magnify(i_dup(small_image, NULL), mag_factor, 1, 0, 0, NULL);

pp_video_display = my_crop_shift(dis, 240, 479,
                  0, 255);
}
```

```
/********************************************************************
load_network
********************************************************************/
void load_network(networkfp, noisy)
    FILE *networkfp;
    int noisy;
{
    int i,n,m, group;
    int index, row, col;

fscanf(networkfp, "%d units", &n_units);
    check_max(n_units, MAX_UNITS, "units");
    if (noisy)
        printf("%d units\n", n_units);
    for (i = 0;i < n_units; i++) {
        unit[i].flavor = 0;
        unit[i].num_inputs = 0;
    } fscanf(networkfp, "%d inputs", &n_inputs);
    check_max(n_inputs, MAX_INPUTS, "inputs");
    if (noisy)
        printf("%d inputs\n", n_inputs);
    for (i = 0; i < n_inputs; i++) {
        fscanf(networkfp, "%d %d %d %d", &index, &group, &row, &col);
        input_index[i] = index;
        unit[index].index = index;
            unit[index].flavor = 1;
        unit[index].group = group;
        unit[index].row = row;
        unit[index].col = col;
    } fscanf(networkfp, "%d hiddens", &n_hiddens);
    check_max(n_hiddens, MAX_HIDDENS, "hiddens");
    if (noisy)
        printf("%d hiddens\n", n_hiddens);
    for (i = 0; i < n_hiddens; i++) {
        fscanf(networkfp, "%d %d %d %d", &index, &group, &row, &col);
        hidden_index[i] = index;
        unit[index].index = index;
            unit[index].flavor = 0;
        unit[index].group = group;
        unit[index].row = row;
        unit[index].col = col;
        unit[index].error = (float *)malloc(MAX_PATTERNS * sizeof(float));
    } fscanf(networkfp, "%d outputs", &n_outputs);
    check_max(n_outputs, MAX_OUTPUTS, "outputs");
    if (noisy)
        printf("%d outputs\n", n_outputs);
    for (i = 0; i < n_outputs; i++) {
        fscanf(networkfp, "%d %d %d %d", &index, &group, &row, &col);
        output_index[i] = index;
        unit[index].index = index;
            unit[index].flavor = 2;
        unit[index].group = group;
        unit[index].row = row;
        unit[index].col = col;
        unit[index].error = (float *)malloc(MAX_PATTERNS * sizeof(float));
        unit[index].target = (float *)malloc(MAX_PATTERNS * sizeof(float));
    } yoking_flag = 0;
    fscanf(networkfp, "%d conns", &n_conns);
    check_max(n_conns, MAX_CONNS, "conns");
    if (noisy)
        printf("%d conns\n", n_conns);
    for (i = 0; i < n_conns; i++) {
        fscanf(networkfp, "%d %d %d", &n, &m, &group);
        conn[i].from = &unit[n];
        conn[i].to   = &unit[m];
        unit[m].num_inputs++; /* increment input weight counter */
        conn[i].yoke_group = group;
        if (group >= 0)
            yoking_flag = 1; /* indicate the network has yoking */
```

```
} for (i=0;i<n_conns;i++) {
        /* tell each conn how my brothers it has, for epsilon calculation */
        conn[i].num_inputs = conn[i].to->num_inputs;
    } fclose(networkfp);
}

/*******************************************************************
init_network
*******************************************************************/
init_network() {
    FILE *networkfp, *weightfp;

make_sigmoid_table();

if ((networkfp = fopen(root, "r")) == NULL) {
        if ((networkfp = fopen(add_ext(root,".net"), "r")) == NULL)
            panic("sentry: can't open %s or %s", root, add_ext(root, ".net"));
    } load_network(networkfp, 1);

if ((weightfp = fopen(add_ext(root,".wet"),"r")) != NULL) {
        printf("Using weight file %s\n", add_ext(root,".wet"));
        read_weights(conn, weightfp);
    }
    else {
        panic("sentry: can't open %s or %s", root, add_ext(root, ".wet"));
    } n_patterns = 1;
}

/*******************************************************************
init_dump_file
*******************************************************************/
init_dump_file() { int n_inputs = IMAGE_ROWS * IMAGE_COLS + 1;
    int n_outputs = 1;
    int n_patterns = num_pos_exemplars + num_neg_exemplars;

putc('\002', dumpfp);
    fwrite (&n_inputs, sizeof(float), 1, dumpfp);
    fwrite (&n_outputs, sizeof(float), 1, dumpfp);
    fwrite (&n_patterns, sizeof(float), 1, dumpfp);
}

/*******************************************************************
initialize
*******************************************************************/
initialize() { i_init();

init_image();

if (mode_flag != 0)
        init_network();

init_alarm();

if ((mode_flag == 0) ||
        (mode_flag == 1) ||
        (refining)) /* open for appending */
        dumpfp = fopen(exemplar_file_name, "w");
    if (mode_flag == 0)
        init_dump_file();
}
```

```
#include "constants.h"
#include "structures.h"
#include "globals.h"

int sleep_i, sleep_j; /* for my_sleep */

/*******************************************************************
main
*******************************************************************/
main() { int exemplar = 0;
  int time_through = 0;
  int bound, num_dumped, max_to_dump;
  float correct_response, actual_response;

printf("\n sentry %.1f\n", VERSION);

init_vars();
  initialize();

if (mode_flag == 0) {
   /* in collection mode */
   MY_SLEEP(10);
   honk();
   correct_response = 0.0;
   while (exemplar < (num_neg_exemplars + num_pos_exemplars)) {
    if (exemplar == num_neg_exemplars) {
      /* switching from negative to positive exemplars */
      correct_response = 1.0; /* change correct response */
      honk();
      MY_SLEEP(10);
      honk();
      get_image(); /* get one image to get rid of last image */
      process_image();
      MY_SLEEP(collect_delay);
    }
    get_image();
    process_image();
    dump_exemplar(correct_response);
    MY_SLEEP(collect_delay);
    exemplar++;
   }
   honk(); /* done sound_alarm */
  } else if (mode_flag == 1) {
   /* in refine mode */
   MY_SLEEP(10);
   honk();
   while (time_through < 2) {
    if (time_through == 0) {
      /* doing negative responses */
      correct_response = 0.0;
      bound = num_neg_test_exemplars;
      max_to_dump = max_neg_test_to_dump;
      num_dumped = 0;
    }
    else if (time_through == 1) {
      /* switching from negative to positive exemplars */
      exemplar = 0;
      bound = num_pos_test_exemplars;
      max_to_dump = max_pos_test_to_dump;
      num_dumped = 0;
      correct_response = 1.0; /* change correct response */
      honk();
      MY_SLEEP(10);
      honk();
      get_image(); /* get one image to get rid of last image */
      process_image();
      MY_SLEEP(test_delay);
    }
    while ((exemplar < bound) &&
        (num_dumped < max_to_dump)) {
     get_image();
     process_image();
```

```
    load_test_pattern();
    sweep_forward(0, 1);
    actual_response = (float)test_for_alarm();
    if (actual_response == 1.0)
      sound_alarm();
    if (actual_response != correct_response) {
      dump_exemplar(correct_response);
      num_dumped++;
    }
    MY_SLEEP(test_delay);
    exemplar++;
   }
   time_through++;
  }
  honk(); /* done sound_alarm */
 }
 else if (mode_flag == 2) {
  /* in test mode */
  while (1) {
   get_image();
   process_image();
   load_test_pattern();
   sweep_forward(0, 1);
   if (test_for_alarm()) {
    sound_alarm();
    if (refining)
      dump_exemplar(0.0);
    if (dumping_images)
      dump_image();
   }
   MY_SLEEP(test_delay);
  }
 }
} include <stdio.h>
include <math.h> char *new_file;
char *old_file;
FILE *newfp, *oldfp, *tempfp;

/*************************************************************
  main
*************************************************************/
main(argc, argv)
    int argc;
    char *argv[];
{
int n_inputs, n_outputs, n_patterns;
int i;
float casebuf[10000];
char c;

if (argc != 3) {
  printf("Usage: merge_data NEW_FILE OLD_FILE\n");
  exit(0);
}
new_file = argv[1];
old_file = argv[2];

newfp = fopen(new_file, "r");
oldfp = fopen(old_file, "r");
tempfp = fopen("/usr/tmp/temp_file.bin", "w");

c = getc (oldfp);
fread (&n_inputs, sizeof(float), 1, oldfp);
fread (&n_outputs, sizeof(float), 1, oldfp);
fread (&n_patterns, sizeof(float), 1, oldfp);

for (i = 0; i < n_patterns; i++) {
  fread(casebuf, sizeof(float), n_inputs+n_outputs, oldfp);
  fwrite(casebuf, sizeof(float), n_inputs+n_outputs, tempfp);
} while (fread(casebuf, sizeof(float), n_inputs+n_outputs, newfp) ==
    n_inputs+n_outputs) {
```

```c
      fwrite(casebuf, sizeof(float), n_inputs+n_outputs, tempfp);
      n_patterns++;
    } fclose(oldfp);
    fclose(newfp);
    fclose(tempfp);

newfp = fopen(new_file, "w");
    tempfp = fopen("/usr/tmp/temp_file.bin", "r");

printf("num patterns = %d\n", n_patterns);
    putc('\002', newfp);
    fwrite (&n_inputs, sizeof(float), 1, newfp);
    fwrite (&n_outputs, sizeof(float), 1, newfp);
    fwrite (&n_patterns, sizeof(float), 1, newfp);

for (i = 0; i < n_patterns; i++) {
        fread(casebuf, sizeof(float), n_inputs+n_outputs, tempfp);
        fwrite(casebuf, sizeof(float), n_inputs+n_outputs, newfp);
    }
}
#include <math.h>
#include "constants.h"
#include "structures.h"
#include "globals.h"

float last_image[IMAGE_ROWS][IMAGE_COLS];
float last_bw_output_image[IMAGE_ROWS][IMAGE_COLS];
float exemplar_buf[1 + IMAGE_ROWS * IMAGE_COLS + 2];

/*****************************************************************
enhance_coherence
*****************************************************************/
enhance_coherence() { register int image_row, image_col;
    register int row_offset, col_offset;
    register float factor;
    float temp[IMAGE_ROWS][IMAGE_COLS];

for (image_row = 0; image_row < IMAGE_ROWS; image_row++) {
        /* determine initial factor */
        factor = 0.0;
        image_col = 0;
        for (row_offset = MAX(0, image_row - mask_size);
             row_offset < MIN(IMAGE_ROWS, image_row + mask_size);
             row_offset++)
          for (col_offset = MAX(0, image_col - mask_size);
               col_offset < MIN(IMAGE_COLS, image_col + mask_size);
               col_offset++)
            factor += bw_output_image[row_offset][col_offset];
        temp[image_row][image_col] = bw_output_image[image_row][image_col] *
            factor * coherence_enhancement_factor;

for (image_col = 1; image_col < IMAGE_COLS; image_col++) {
            /* subtract off left column from mask from factor */
            col_offset = MAX(0, (image_col - 1) - mask_size);
            for (row_offset = MAX(0, image_row - mask_size);
                 row_offset < MIN(IMAGE_ROWS, image_row + mask_size);
                 row_offset++)
              factor -= bw_output_image[row_offset][col_offset];
            /* add on right column of mask to factor */
            col_offset = MIN(IMAGE_COLS, image_col + mask_size) - 1;
            for (row_offset = MAX(0, image_row - mask_size);
                 row_offset < MIN(IMAGE_ROWS, image_row + mask_size);
                 row_offset++)
              factor += bw_output_image[row_offset][col_offset];
            temp[image_row][image_col] = bw_output_image[image_row][image_col] *
                factor * coherence_enhancement_factor;
        }
    } for (image_row = 0; image_row < IMAGE_ROWS; image_row++)
      for (image_col = 0; image_col < IMAGE_COLS; image_col++) {
```

```c
    bw_output_image[image_row][image_col] = MIN(1.0, temp[image_row][image_col]);
   }
 }
/*******************************************************************************
  highlight_image_changes
*******************************************************************************/
highlight_image_changes() { static int first_time = 1;
  register int image_row, image_col;

if (first_time) {
    for (image_row = 0; image_row < IMAGE_ROWS; image_row++)
      for (image_col = 0; image_col < IMAGE_COLS; image_col++) {
        last_image[image_row][image_col] =
          unnormalized_bw_image[image_row][image_col];
        last_bw_output_image[image_row][image_col] = 0.0;
      }
    first_time = 0;
  } for (image_row = 0; image_row < IMAGE_ROWS; image_row++)
    for (image_col = 0; image_col < IMAGE_COLS; image_col++) {
      bw_output_image[image_row][image_col] =
        FABS(unnormalized_bw_image[image_row][image_col] -
          last_image[image_row][image_col]);
      bw_output_image[image_row][image_col] /= MAX(unnormalized_bw_image[image_row][image_col],
                          last_image[image_row][image_col]) + 0.000001;
      bw_output_image[image_row][image_col] = MIN(1.0, bw_output_image[image_row][image_col]);
    } enhance_coherence();

for (image_row = 0; image_row < IMAGE_ROWS; image_row++)
    for (image_col = 0; image_col < IMAGE_COLS; image_col++) {
      bw_output_image[image_row][image_col] =
        MAX(bw_output_image[image_row][image_col],
          decay_factor * last_bw_output_image[image_row][image_col]);
      last_bw_output_image[image_row][image_col] = bw_output_image[image_row][image_col];
      last_image[image_row][image_col] = unnormalized_bw_image[image_row][image_col];
    }
}

/*******************************************************************************
  display_pp_image
*******************************************************************************/
display_pp_image() { register int color;
  register int row, col;

/* put road in */
  for (row = 0; row < IMAGE_ROWS; row++)
    for (col = 0; col < IMAGE_COLS; col++) {
      color = (int)(255 * bw_output_image[row][col]);
      i_cputpixel(small_image, row, col, color);
    } i_copy(pp_video_display, big_image, 0, NULL);
}

/*******************************************************************************
  process_image
*******************************************************************************/
process_image() { highlight_image_changes();
  if (display_acts)
    display_pp_image();
}
include <stdio.h>
include <math.h>
#include "constants.h"
#include "structures.h"
#include "globals.h"
```

```
/******************************************************************
 add_ext
 ******************************************************************/
char *add_ext(root, ext)
    char *root, *ext;
{
 char filename[256];

sprintf(filename, "%s%s", root, ext);
 return(filename);
}
/******************************************************************
 compute_sigmoid
 ******************************************************************/
float compute_sigmoid(x)
    double x;
{
 float e;

if (x > 50.0)
        return(1.0);
 if (x < -50.0)
        return(0.0);
 e = exp(x);
 return(e / (e + 1.0));
}

/******************************************************************
 make_sigmoid_table
 ******************************************************************/
void make_sigmoid_table ()
{
 int x;

for (x = -10000; x < 10000; x++)
        sigmoid_table[x+10000] = compute_sigmoid(x / 200.0);
}

/******************************************************************
 prompt_file
 ******************************************************************/
FILE *prompt_file(the_prompt,mode)
    char *the_prompt,*mode;
{
 char    filename[50];
 FILE *workfp;
 int success = 1;

do {
  if (!success) printf("Can't open %s.\n",filename);
  for (c = cstart,clim=cstart+n_conns; c < clim; c++)
        fscanf(weightfp,"%f\n", &c->weight);
 fclose (weightfp);
}
  printf (the_prompt);
  scanf ("%s", filename);
  success = ((workfp = fopen (filename, mode)) != NULL);
 } while (!success);
 return (workfp);
}

/******************************************************************
 prompt_string
 ******************************************************************/
char *prompt_string(the_prompt, string)
    char *the_prompt,*string;
{
 printf(the_prompt);
 scanf("%s", string);
 return(string);
}

/******************************************************************
 check_max
 ******************************************************************/
```

```
check_max(n,mx,st)
    int n,mx;
    char *st;
{
 if (n > mx)
   punt("Maximum number of %s exceeded.",st);
}

/*******************************************************************
 punt
 *******************************************************************/
punt(s1, s2)
    char *s1,*s2;
{
 printf(s1, s2);
 printf("\n");
 printf("Punting...\n");
 exit(1);
}

/*******************************************************************
 read_weights
 *******************************************************************/
read_weights(cstart, weightfp)
    struct conn_type *cstart;
    FILE *weightfp;
{
 struct conn_type *c,*clim;
 int n;
 int foo;

fscanf(weightfp, "%d epochs", &foo);
 fscanf(weightfp, "%d weights", &n);
 if (n!=n_conns)
   printf("Wrong number of weights.\n");
 else
```

VERSION = 1.5

CODE_NAME = sentry

MACHINE = sun4 include /usr/pomerlea/sentry/include/${MACHINE}_sentry.make

LIBS = ${GIL_LIBS} ${UTIL_LIBS} ${CONT_LIBS} ${MISC_LIBS}

LOCAL_FLAGS = -DANDROX
LOCAL_FLAGS = -DVIP

IFLAGS = ${GIL_INCL} ${UTIL_INCL} ${CONT_INCL} ${MISC_INCL}
CFLAGS = ${LOCAL_FLAGS} ${FLAGS} ${IFLAGS}

SOURCES = init_vars.c initialize.c get_image.c process_image.c backprop.c \
          alarm.c utils.c main.c OBJECTS = init_vars.o initialize.o get_image.o process_image.o backprop.o \
          alarm.o utils.o main.o AUX_FILES = constants.h structures.h globals.h Makefile sentry : ${OBJECTS}
        ${CC} ${CFLAGS} ${OBJECTS} ${LIBS}    -o sentry init_vars.o : init_vars.c constants.h structures.h globals.h
        ${CC} ${CFLAGS} -c init_vars.c initialize.o : initialize.c constants.h structures.h globals.h
        ${CC} ${CFLAGS} -c initialize.c get_image.o : get_image.c constants.h structures.h globals.h
        ${CC} ${CFLAGS} -c get_image.c process_image.o : process_image.c constants.h structures.h globals.h
        ${CC} ${CFLAGS} -c process_image.c

```
backprop.o : backprop.c constants.h structures.h globals.h
        ${CC} ${CFLAGS} -c backprop.c alarm.o : alarm.c constants.h structures.h globals.h
        ${CC} ${CFLAGS} -c alarm.c utils.o : utils.c constants.h structures.h globals.h
        ${CC} ${CFLAGS} -c utils.c main.o : main.c constants.h structures.h globals.h
        ${CC} ${CFLAGS} -c main.c foo : foo.c
        ${CC} ${CFLAGS} foo.c -o foo ${LIBS} include /usr/pomerleau/sentry/include/backup.make
```

```c
/***************************************************************
 *                                  *
 *                                  *
 *                                  *
 *                                  *
 *                                  *
 *                                  *
 *         Extended Backpropagation       *
 *             Simulator              *
 *                                  *
 *                                  *
 *                by                *
 *            Dean Pomerleau           *
 *                                  *
 *                                  *
 *                                  *
 *             Copyright              *
 *               1990               *
 *                                  *
 *                                  *
 ***************************************************************/ define NULL 0 define FLOAT_ZERO  ((float) 0.0)
define FLOAT_HALF  ((float) 0.5)
#define FLOAT_ONE   ((float) 1.0)
#define FLOAT_TWO   ((float) 2.0)

#define MIN(arg1, arg2)      (((arg1) < (arg2)) ? (arg1) : (arg2))
#define MAX(arg1, arg2)      (((arg1) > (arg2)) ? (arg1) : (arg2))
#define RAND_FLOAT(min, max) ((random() % 10000) * (((max) - (min)) / 10000.0) + (min))
#define RAND_INT(min, max)   ((random() % ((max) - (min) + 1)) + (min))
#define FABS(arg)            (fabs(arg))
#define SQRT(arg)            sqrt((double)(arg))

#define NORMAL_ERROR(ACTUAL,DESIRED) (DESIRED - ACTUAL)

#define MARGIN 0.2
#define LIBERAL_ERROR1(ACTUAL,DESIRED) \
  (((fabs(DESIRED - ACTUAL) < MARGIN) ? FLOAT_ZERO : (DESIRED - ACTUAL))

#define LIBERAL_ERROR2(ACTUAL,DESIRED) \
  (((fabs(DESIRED - ACTUAL) < MARGIN) ? \
    FLOAT_ZERO : \
    ((DESIRED > ACTUAL) ? ((DESIRED - MARGIN) - ACTUAL) :\
             ((DESIRED + MARGIN) - ACTUAL)))

define ERRORFUN NORMAL_ERROR define SIGMOID(z,index)\
 ((index = ((int) (200 * z))) >= 10000 ? FLOAT_ONE :\
  (index < -10000 ? FLOAT_ZERO :\
   sigmoid_table[index+10000]))

#define MAX_UNITS    2300
#define MAX_CONNS    10000
```

```c
#define MAX_INPUTS      2200
#define MAX_OUTPUTS 50
#define MAX_HIDDENS (MAX_UNITS - MAX_INPUTS - MAX_OUTPUTS)
#define MAX_YOKE_GROUPS  500   /* maximum number of groups of yoked weights */
define MAX_PATTERNS   400 define   FILENAMELEN 50
define SEED     10 define HIST_RESOLUTION 4000 /* number of buckets in histogram */ struct    unit_type {
  float output[MAX_PATTERNS]; /* activation to be propagated forward*/
  float *error;         /* error derivative to be propagated backward (applies
                           only to hidden and output units) */
  float *target;        /* desired value (applies only to output units) */
  short flavor;         /* 0=hidden, 1=input, 2=output */
  short flag;           /* has unit's {output, error} been computed yet? */
  int   index;          /* the unique number of this unit */
  int   num_inputs;     /* number of input connections */
  int   group;          /* the unit group this unit is in */
  int   row;            /* this units row in its unit group */
  int   col;            /* this units col in its unit group */
};

struct    conn_type {
  float weight;
  float dweight;
  float gradweight;
  float prevgradweight;
  float num_inputs;     /* how many inputs the to unit has (for lrc calc.) */
  int   yoke_group;     /* group this connection is yoked in (-1 if not yoked */
  struct unit_type *from;
  struct unit_type *to;
};

#include "constants.h"

int n_units;
int n_conns;
int       n_inputs;
int       n_hiddens;
int       n_outputs;
int       n_patterns;

/* boring bookkeeping stuff */
int   ennuvits;
int   onlinep;
int   epoch;
int   suspend;
int   yoking_flag;
int   current_pattern;
int         this_pattern;
int         checkpoint_interval;
int   weight_update_interval; /* how many patterns to collect weight
                     changes over before actually changing
                     weights */
#ifdef DISPLAY
int   use_display;       /* 0 means don't use display */
int   display_update_interval; /* how many epochs before updating display */
endif /* error statistics variables */
float gradlensum;
float prevlensum;
float prevgradcrossprod;
float prevgrad;
float total_error;
int   error_patterns;  /* number of incorrect patterns */
float max_pattern_error[MAX_PATTERNS]; /* error on each pattern */

/* the bestguess measure considers a case correct when the correct
   output is most active. It is useful for tasks with one-hot output
   codings. */
int use_bestguess;
```

```c
int bestguess_distance; /* distance from correct unit still considered
                           correct */
int use_auto_pilot;  /* control parameters automatically */ float sigmoid_table [20000];
char *root;
char checkname[FILENAMELEN];
int  checknameflag;

/* learning parameters */ float epsilon;      /* The gradient is multiplied by this */
float momentum;     /* This much of the previous weight step is
                       /* added to the current one */
float decay_rate;   /* This percent of the weights magnitude is
                       subtracted from weight on each update */
float tolerance;

struct   unit_type     unit[MAX_UNITS];
struct   conn_type     conn[MAX_CONNS];

/* A network's structure is specified by a .net file. This
   program assumes that the connection list in this file is
   topologically sorted from input to output. */
/* The environment is stored here */
/* These patterns are read from a .env file */
FILE  *networkfp;

float  prune_error_sacrifice; /* percent increase in total error you are
                                  willing to sustain during pruning */
float  percent_to_prune;  /* percent of connections to prune */
int  pruned_conns[MAX_CONNS]; /* indicates connections marked for pruning */
int  permute_list[MAX_CONNS]; /* the index of conn element being permuted to,
                                 -1 if this conn is being pruned */
int  hist[HIST_RESOLUTION];   /* buckets for histogram */

/* which units are the inputs and outputs? */
int     input_index[MAX_INPUTS];
int     hidden_index[MAX_HIDDENS];
int     output_index[MAX_OUTPUTS];

float   casebuf [MAX_UNITS];

extern void make_sigmoid_table ();
FILE *fopen(), *prompt_file();
extern char  *add_ext();

#ifdef DISPLAY
char display_device[FILENAMELEN];
endif void get_checkname();
void checkpoint_weights();
void avg_weight();
void randomize_weights();
void read_weights();
void write_weights();
void print_error_patterns();
void dump_states();
void prune();

void read_ascii_patterns();
void read_binary_patterns();
void after_reading_patterns();
void load_patterns ();
void write_environment();
void write_net();
void auto_pilot();

void initialize_display();
void add_display();
void delete_display();
void move_display();
void update_display();

#include <stdio.h>
include <math.h>
```

```c
#include "constants.h"
#include "structures.h"
#include "globals.h"

#define BUF_SIZE 3
#define MAX_EPSILON 10.0
#define MAX_MOMENTUM 0.95

/***************************************************************************
  auto_pilot
***************************************************************************/
void auto_pilot() { static float grad[BUF_SIZE];
  int i;
  float avg_grad = 0.0;

if (epoch < BUF_SIZE) {
    grad[BUF_SIZE - epoch] = prevgrad;
  }
  else {
    /* update buffer of previous gradients */
    for (i = BUF_SIZE - 1; i > 0; i--) {
      grad[i] = grad[i - 1];
    }
    grad[0] = prevgrad;

/* sum gradients */
    for (i = 0; i < BUF_SIZE; i++) {
      avg_grad += grad[i];
    }
    avg_grad /= BUF_SIZE;

if (avg_grad < 0.80) {
      epsilon *= 0.985;
      momentum += (1.0 - momentum) * 0.015;
    }
    else if (avg_grad > 0.80) {
      epsilon *= 1.015;
    } epsilon = MIN(MAX(epsilon, 0.0), MAX_EPSILON);
    momentum = MIN(MAX(momentum, 0.0), MAX_MOMENTUM);
  }
} include <stdio.h>
include <math.h>
#include "constants.h"
#include "structures.h"
#include "globals.h"

/***************************************************************************
  sweep_forward
***************************************************************************/
void sweep_forward(start, end)
    int start, end;
{
/* compute units' activations */ struct conn_type *c;
  struct unit_type *u,*v;
  struct conn_type *clim;
  struct unit_type *ulim;
  int i,j;
  int index;
  register int pat;
  register int start_pat = start;
  register int end_pat = end;

for (u = unit,ulim=unit+n_units; u < ulim; u++) {
    if (u->flavor == 1) /* if input unit */
      u->flag = 0;
    else {
```

```c
    for (pat = start_pat; pat < end_pat; pat++)
      u->output[pat] = 0.0;     /* clear accumulators */
    u->flag = 1;                /* flag output as needing to be computed */
  }
} for (c = conn,clim=conn+n_conns; c < clim; c++) {
  u = c->from;
  v = c->to;
  if (u->flag) {  /* compute activation the first time it is needed */
    for (pat = start_pat; pat < end_pat; pat++)
      u->output[pat] = SIGMOID(u->output[pat], index); /* SIGMOID is in constants.h */
    u->flag = 0;
  }
  for (pat = start_pat; pat < end_pat; pat++)
    v->output[pat] += c->weight * u->output[pat];  /* propagate forward across link */
} for (j = 0; j < n_outputs; j++) {/* compute output units' activations*/
  i = output_index[j];
  for (pat = start_pat; pat < end_pat; pat++)
    unit[i].output[pat] = SIGMOID (unit[i].output[pat], index);
}
}

/*************************************************************/ void calc_error(start, end)
    int start, end;
{
  register struct unit_type *u, *ulim;
  float temp[MAX_PATTERNS];
  register int pat;
  register int start_pat = start;
  register int end_pat = end;

for (pat = start_pat; pat < end_pat; pat++)
    max_pattern_error[pat] = 0.0;

for (u = unit,ulim=unit+n_units; u < ulim; u++) {
    u->flag = 1;
    if (u->flavor == 2) {
      for (pat = start_pat; pat < end_pat; pat++) {
        temp[pat] = ERRORFUN(u->output[pat],u->target[pat]);
        total_error += temp[pat] * temp[pat];
        max_pattern_error[pat] = MAX(max_pattern_error[pat], fabs(temp[pat]));
        u->error[pat] = 2.0 * temp[pat]; /* derivative of output unit's error */
      }
    }
    else if (u->flavor == 0) {
      for (pat = start_pat; pat < end_pat; pat++)
        u->error[pat] = 0.0;     /* clear accumulator */
    }
  }
  for (pat = start_pat; pat < end_pat; pat++) {
    if (((max_pattern_error[pat] > tolerance) && (!use_bestguess)) ||
        (use_bestguess && !best_guessp(pat)))
      error_patterns++;
  }
}

/*************************************************************
back_propagate
*************************************************************/
void back_propagate(start, end)
    int start, end;
{
  /* compute error gradient */ struct conn_type *c;
  struct unit_type *u,*v;
  struct conn_type *clim;
  struct unit_type *ulim;
  register float *to_error;
```

```
register float *from_error;
register float *from_error_lim;
register float *output;
register float *output_lim;

for (c = conn+n_conns-1,clim=conn-1; c > clim; c--) {
    u = c->from;
    v = c->to;

/* ... it is needed */ c->dweight = (cached_lrc * c->gradweight) +
                 (momentum * c->dweight) +
                 (-1 * c->weight * decay_rate);

/* do it */
    c->weight += c->dweight;

/* compute statistics for printing out */
    grd = c->gradweight;
    prv = c->prevgradweight;
    gradlensum  += grd * grd;
    prevlensum  += prv * prv;
    prevgradcrossprod += prv * grd;
    c->prevgradweight = grd;
    c->gradweight = 0.0;
} dvar = sqrt(prevlensum * gradlensum);
if (dvar == 0.0)
    prevgrad = 0.0;
else
    prevgrad = prevgradcrossprod / dvar;

if (yoking_flag)
    average_yoked_weights();
}

/*************************************************************
 do_epoch
 *************************************************************/
void do_epoch()
{
    int start_pat, end_pat;

for (start_pat = 0;
         start_pat < n_patterns;
         start_pat += weight_update_interval) {
        end_pat = MIN(start_pat + weight_update_interval, n_patterns);
        sweep_forward(start_pat, end_pat);
        calc_error(start_pat, end_pat);
        back_propagate(start_pat, end_pat);
        update_weights();
        if (use_auto_pilot)
            auto_pilot();
    }
    output_stats();
}

/* binize allows you to convert between ascii and binary environment files */ include <stdio.h>
include <fcntl.h>
#include "constants.h"
#include "structures.h"
#include "globals.h"

#define OPEN_FOR_READING(file_name, file_desc) { \
    if ((file_desc = open(file_name, O_RDONLY)) == -1) { \
        printf("could not open file : %s for reading\n",file_name); \
    } \
} define READ_FROM_OPEN(pt,fd,size) { \
```

```
    int i; \
    i=read(fd,pt_size); \
    if (i< size) { \
      printf("could only read %d bytes\n",i); \
    } \
} float in_pattern[MAX_PATTERNS][MAX_INPUTS];
float out_pattern[MAX_PATTERNS][MAX_OUTPUTS];

int truncatep = 0;

void read_ascii(patternfp)
FILE *patternfp;
{
  int  i,
       j,
       n;
  int  ok = 1;

fscanf (patternfp, "%d inputs", &n);
  n_inputs = n;
  fscanf (patternfp, "%d outputs", &n);
  n_outputs = n;

fscanf (patternfp, "%d patterns", &n_patterns);
  check_max (n_patterns, MAX_PATTERNS, "patterns");

if (ok) {
      for (i = 0; i < n_patterns; i++) {
        for (j = 0; j < n_inputs; j++) {
              fscanf (patternfp, "%f", &in_pattern[i][j]);
              if (truncatep && (in_pattern[i][j] > 2.0))
                  in_pattern[i][j] = 2.0;
        }
        for (j = 0; j < n_outputs; j++)
              fscanf (patternfp, "%f", &out_pattern[i][j]);
      }
  }
}
void my_read() { int  i,
       j,
       k,
       n;
  char file_name[100];
  char input_file_name[100], output_file_name[100];
  int  input_file_desc, output_file_desc;
  int  ok = 1;

printf("enter file prefix for road data file (e.g. road300_1) > ");
  scanf("%s", file_name);
  strcpy(input_file_name, file_name);
  strcat(input_file_name, "_input.bin");
  strcpy(output_file_name, file_name);
  strcat(output_file_name, "_output.bin");

OPEN_FOR_READING(input_file_name, input_file_desc);
  OPEN_FOR_READING(output_file_name, output_file_desc);

printf("Enter number of input units (including bias) > ");
  scanf("%d", &n_inputs);

printf("Enter number of output units > ");
  scanf("%d", &n_outputs);

printf("Enter number of patterns > ");
  scanf("%d", &n_patterns);

check_max (n_patterns, MAX_PATTERNS, "patterns");

if (ok) {
      for (i = 0; i < n_patterns; i++) {
```

```c
        READ_FROM_OPEN(&casebuf[0], input_file_desc, 4 * n_inputs);
        READ_FROM_OPEN(&casebuf[n_inputs], output_file_desc, 4 * n_outputs);
            k = 0;
            for (j = 0; j < n_inputs; j++) {
                    in_pattern[i][j] = casebuf[k++];
                    if (truncatep && (in_pattern[i][j] > 2.0))
                            in_pattern[i][j] = 2.0;
            }
            for (j = 0; j < n_outputs; j++)
                    out_pattern[i][j] = casebuf[k++];
        }
    }
} void read_binary(patternfp)
FILE *patternfp;
{
    int   i,
          j,
          k,
          n;
    int   ok = 1;

fread (&n, sizeof (float), 1, patternfp);
    n_inputs = n;
    fread (&n, sizeof (float), 1, patternfp);
    n_outputs = n;

fread (&n, sizeof (float), 1, patternfp);
    n_patterns = n;
    check_max (n_patterns, MAX_PATTERNS, "patterns");

if (ok) {
        for (i = 0; i < n_patterns; i++) {
            fread (casebuf, sizeof (float), n_inputs + n_outputs, patternfp);
            k = 0;
            for (j = 0; j < n_inputs; j++) {
                    in_pattern[i][j] = casebuf[k++];
                    if (truncatep && (in_pattern[i][j] > 2.0))
                            in_pattern[i][j] = 2.0;
            }
            for (j = 0; j < n_outputs; j++)
                    out_pattern[i][j] = casebuf[k++];
        }
    }
} void read_it ()
{
    FILE *patternfp = prompt_file ("Environment file: ", "r");
    int c = getc (patternfp);
    if (c == 2)
            read_binary (patternfp);
    else {
            ungetc (c, patternfp);
            read_ascii (patternfp);
    }
    fclose (patternfp);
} void write_ascii ()
{
    int i,j,n;
    FILE *patternfp = prompt_file("Environment file to write: ","w");

fprintf (patternfp, "%d inputs\n", n_inputs);
    fprintf (patternfp, "%d outputs\n", n_outputs);
    fprintf (patternfp, "%d patterns\n", n_patterns);

for (i = 0; i < n_patterns; i++) {
```

```
                    fprintf (patternfp, "\n");
                    for (j = 0; j < n_inputs; j++)
                            fprintf (patternfp, "%g\n", in_pattern[i][j]);
                    for (j = 0; j < n_outputs; j++)
                            fprintf (patternfp, "%g\n", out_pattern[i][j]);
        }
        fclose (patternfp);
} void write_binary()
{
int i,j,k,n;
FILE *patternfp = prompt_file("Environment file to write: ","w");

putc('\002', patternfp);
    fwrite (&n_inputs, sizeof(float), 1, patternfp);
    fwrite (&n_outputs, sizeof(float), 1, patternfp);
    fwrite (&n_patterns, sizeof(float), 1, patternfp);

for (i = 0; i < n_patterns; i++) {
       k=0;
       for (j = 0; j < n_inputs; j++)
            casebuf[k++] = in_pattern[i][j];
       for (j = 0; j < n_outputs; j++)
            casebuf[k++] = out_pattern[i][j];
       fwrite (casebuf, sizeof(float), n_inputs+n_outputs, patternfp);
    }
    fclose (patternfp);

} void oldread_it ()
{
    FILE *patternfp;
    char c[50];
    printf ("\n");
    printf ("ascii or binary? ");
    scanf ("%s", c);
    patternfp = prompt_file ("Environment file: ", "r");
    if (c[0] == 'a')
            read_ascii (patternfp);
    if (c[0] == 'b')
            read_binary (patternfp);
    fclose (patternfp);
} void write_it ()
{
    char  c[50];
    printf("\n");
    printf ("ascii or binary? ");
    scanf ("%s", c);
    if (c[0] == 'a')   write_ascii ();
    if (c[0] == 'b')   write_binary ();
} void query_user()
{
    char  c[50];
    printf("\n");
    while (1) {
            printf ("read, my_read, write, oldread, truncatep, quit? ");
            scanf ("%s", c);
        if (c[0] == 'w')   write_it ();
            if (c[0] == 'r')   read_it ();
    if (c[0] == 'm')   my_read ();
```

```
    if (c[0] == 'o')  oldread_it ();
    if (c[0] == 't')  truncatep = 1;
    if (c[0] == 'q')  exit(0);
  }
} main(argc, argv)
int argc;
char *argv[];
{
  query_user ();
} ifdef DISPLAY include <stdio.h>
include <gimage.h>
#include <math.h>
#include <tools.h>
#include <constants.h>
#include <structures.h>
include <globals.h> define my_crop_shift(img, rs, re, cs, ce)\
  i_shift(i_crop(i_dup(img, NULL),\
         si_subimage(rs, re, cs, ce, NULL), NULL),\
      0, 0, NULL)

#define MAX_ROWS 45
#define MAX_COLS 48
define MAX_WINDOWS 20 define SCALE_ACTS 0   /* 1 means scale activation values to use full dynamic
              range of display */ struct window_type {
  int type;          /* 0 for inactive,
               1 for weights,
               2 for acts,
               3 for target */
  int pattern;       /* if act window, the pattern its looking at */
  int rows;          /* number of rows in window */
  int cols;          /* number of cols in window */
  int window[MAX_ROWS][MAX_COLS];  /* index (in units or conns) of elements */
  IMAGE *small_image;    /* small window image */
  IMAGE *big_image;      /* magnified small image */
  SUBIMAGE display_bounds;  /* bounds of display image */
  IMAGE *display_image;  /* part of dis where big image is copied to */
};

struct window_type window_array[MAX_WINDOWS]; /* contains window discriptions */

IMAGE *dis;
unsigned char background_color[3] = {0, 0, 80};
unsigned char empty_color[3] = {60, 0, 0};

/*******************************************************
initialize_display
*******************************************************/
void initialize_display() { int window;

i_init();
  dis = i_mopen(display_device, IM_COLOR, IM_MODIFY, NULL);
  i_mcfillimg(dis, background_color);

/* initialize all windows inactive */
  for (window = 0; window < MAX_WINDOWS; window++)
    window_array[window].type = 0;
}

/*******************************************************
get_rows_cols
*******************************************************/
void get_rows_cols(group, max_rows, max_cols)
  int group, *max_rows, *max_cols;
```

```c
{
register struct unit_type *u, *ulim;

*max_rows = *max_cols = 0;
for (u = unit,ulim=unit+n_units; u < ulim; u++) {
  if (u->group == group) {
    if (u->row > *max_rows)
      *max_rows = u->row;
    if (u->col > *max_cols)
      *max_cols = u->col;
  }
}
(*max_rows)++; /* starts at 0, so increment by 1 */
(*max_cols)++; /* starts at 0, so increment by 1 */
}

/****************************************************************************
fill_weight_window_pointers
****************************************************************************/
void fill_weight_window_pointers(window_num, unit_group, single_unit, direction)
    int window_num, unit_group, single_unit, direction;
{
int i;
register struct conn_type *c;
int row, col;
register struct unit_type *to_unit, *from_unit;

for (row = 0; row < MAX_ROWS; row++)
  for (col = 0; col < MAX_COLS; col++)
    window_array[window_num].window[row][col] = -1;

for (i = 0; i < n_conns; i++) {
  c = &conn[i];
  to_unit = c->to;
  from_unit = c->from;
  if ((direction == 0) &&
      (from_unit->group == unit_group) &&
      (to_unit->index == single_unit))
    window_array[window_num].window[from_unit->row][from_unit->col] = i;
  else if ((direction == 1) &&
      (to_unit->group == unit_group) &&
      (from_unit->index == single_unit))
    window_array[window_num].window[to_unit->row][to_unit->col] = i;
}
}

/****************************************************************************
fill_unit_window_pointers
****************************************************************************/
void fill_unit_window_pointers(window_num, unit_group)
    int window_num, unit_group;
{
int i;
register struct unit_type *u;
int row, col;

for (row = 0; row < MAX_ROWS; row++)
  for (col = 0; col < MAX_COLS; col++)
    window_array[window_num].window[row][col] = -1;

for (i = 0; i < n_units; i++) {
  u = &unit[i];
  if (u->group == unit_group)
    window_array[window_num].window[u->row][u->col] = i;
}
}

/****************************************************************************
get_mag_factor
****************************************************************************/
int get_mag_factor(rs, re, cs, ce, row_start, col_start)
```

```
    int *rs, *re, *cs, *ce;
    int *row_start, *col_start;
{
  int row_end, col_end;
  int mag_factor;

printf("Choose upper left corner of window\n");
  i_getpos(dis, row_start, col_start, NULL);

row_end = *row_start;
  col_end = *col_start;

printf("Choose lower right corner of window\n");
  i_getpos(dis, &row_end, &col_end, NULL);

mag_factor = (int)((col_end - *col_start + 1) /
          (*ce - *cs + 1));

return(mag_factor);
}

/******************************************************************************
  get_display_params
******************************************************************************/
void get_display_params(window_num, rs, re, cs, ce, mag_factor, row_start, col_start)
    int window_num;
    int *rs, *re, *cs, *ce;
    int *mag_factor;
    int *row_start, *col_start;
{
  *rs = *cs = 0;
  *re = window_array[window_num].rows - 1;
  *ce = window_array[window_num].cols - 1;
  *mag_factor = get_mag_factor(rs, re, cs, ce, row_start, col_start);
}

/******************************************************************************
  make_display_images
******************************************************************************/
void make_display_images(window_num, small_bounds, mag_factor, row_start, col_start)
    int window_num;
    SUBIMAGE small_bounds;
    int mag_factor;
    int row_start, col_start;
{
  int display_rs, display_re, display_cs, display_ce;

window_array[window_num].small_image = i_mtemp(IM_COLOR, IM_UNSIGNED, 8, small_bounds, NUL window_array[window_num].big_image =
    i_magnify(i_dup(window_array[window_num].small_image, NULL), mag_factor, 1, 0, 0, NULL);

window_array[window_num].display_bounds.rs =
    i_rstart(window_array[window_num].big_image) + row_start;
  window_array[window_num].display_bounds.re =
    i_rend(window_array[window_num].big_image) + row_start;
  window_array[window_num].display_bounds.cs =
    i_cstart(window_array[window_num].big_image) + col_start;
  window_array[window_num].display_bounds.ce =
    i_cend(window_array[window_num].big_image) + col_start;

window_array[window_num].display_image = my_crop_shift(dis,
              window_array[window_num].display_bounds.rs,
              window_array[window_num].display_bounds.re,
              window_array[window_num].display_bounds.cs,
              window_array[window_num].display_bounds.ce);
}

/******************************************************************************
  get_index
******************************************************************************/
int get_index(group, row, col)
    int group, row, col;
```

```
{
  int i;
  int index = -1;
  register struct unit_type *u, *ulim;

for (i = 0; i < n_units; i++) {
    u = &unit[i];
    if ((u->group == group) &&
        (u->row == row) &&
        (u->col == col)) {
      index = i;
      break;
    }
  }
  return(index);
}

/*************************************************************
    update_weight_window
*************************************************************/
void update_weight_window(window_num)
    int window_num;
{
  int row, col;
  int conn_index;
  float max = -1000.0;
  float min =  1000.0;
  float weight;
  unsigned char color[3];
  float hist_array[MAX_CONNS];
  int i = 0;

/* if only one weight, just make it black or white depending on sign */
  if ((window_array[window_num].rows == 1) &&
      (window_array[window_num].cols == 1)) {
    conn_index = window_array[window_num].window[0][0];
    min = -1 * fabs(conn[conn_index].weight);
    max = fabs(conn[conn_index].weight);
  }
  else {
    for (row = 0; row < window_array[window_num].rows; row++)
      for (col = 0; col < window_array[window_num].cols; col++) {
        conn_index = window_array[window_num].window[row][col];
        if (conn_index != -1) {
          hist_array[i++] = conn[conn_index].weight;
        }
      }
    histogram_ends(hist_array, i, 0.2, &min, &max);
  } for (row = 0; row < window_array[window_num].rows; row++)
    for (col = 0; col < window_array[window_num].cols; col++) {
      conn_index = window_array[window_num].window[row][col];
      if (conn_index == -1) {
        i_mcputpixel(window_array[window_num].small_image,
            row,
            col,
            empty_color);
      }
      else {
        weight = MAX(min, MIN(max, conn[conn_index].weight));
        color[0] = color[1] = color[2] =
          (char)(255 * ((weight - min) /
              (max - min + 0.000001)));
        i_mcputpixel(window_array[window_num].small_image,
            row,
            col,
            color);
      }
    } i_copy(window_array[window_num].display_image,
      window_array[window_num].big_image,
```

```
        0,
        NULL);
}

/******************************************************
 update_act_window
******************************************************/
void update_act_window(window_num)
    int window_num;

{
 int row, col;
 int unit_index;
 float max = -1000.0;
 float min =  1000.0;
 unsigned char color[3];
 int pattern = window_array[window_num].pattern;

for (row = 0; row < window_array[window_num].rows; row++)
  for (col = 0; col < window_array[window_num].cols; col++) {
    unit_index = window_array[window_num].window[row][col];
    if (unit_index != -1) {
      if (unit[unit_index].output[pattern] > max)
        max = unit[unit_index].output[pattern];
      if (unit[unit_index].output[pattern] < min)
        min = unit[unit_index].output[pattern];
    }
  } for (row = 0; row < window_array[window_num].rows; row++)
  for (col = 0; col < window_array[window_num].cols; col++) {
    unit_index = window_array[window_num].window[row][col];
    if (unit_index == -1) {
      i_mcputpixel(window_array[window_num].small_image,
          row,
          col,
          empty_color);
    }
    else { if (SCALE_ACTS) {
        color[0] = color[1] = color[2] =
         (char)(255 * ((unit[unit_index].output[pattern] - min) /
             (max - min)));
      }
      else
        color[0] = color[1] = color[2] =
         (char)(255 * unit[unit_index].output[pattern]);
      i_mcputpixel(window_array[window_num].small_image,
          row,
          col,
          color);
    }
  } i_copy(window_array[window_num].display_image,
     window_array[window_num].big_image,
     0,

NULL);
}

/******************************************************
 update_target_window
******************************************************/
void update_target_window(window_num)
    int window_num;

{
 int row, col;
 int unit_index;
 float max = -1000.0;
 float min =  1000.0;
 unsigned char color[3];
 int pattern = window_array[window_num].pattern;
```

```c
  for (row = 0; row < window_array[window_num].rows; row++)
   for (col = 0; col < window_array[window_num].cols; col++) {
    unit_index = window_array[window_num].window[row][col];
    if (unit_index != -1) {
      if (unit[unit_index].output[pattern] > max)
        max = unit[unit_index].target[pattern];
      if (unit[unit_index].target[pattern] < min)
        min = unit[unit_index].target[pattern];
    }
   } for (row = 0; row < window_array[window_num].rows; row++)
   for (col = 0; col < window_array[window_num].cols; col++) {
    unit_index = window_array[window_num].window[row][col];
    if (unit_index == -1) {
      i_mcputpixel(window_array[window_num].small_image,
            row,
            col,
            empty_color);
    }
    else { if (SCALE_ACTS) {
       color[0] = color[1] = color[2] =
         (char)(255 * ((unit[unit_index].target[pattern] - min) /
            (max - min)));
     }
     else
       color[0] = color[1] = color[2] =
         (char)(255 * unit[unit_index].target[pattern]);
     i_mcputpixel(window_array[window_num].small_image,
            row,
            col,
            color);
    }
   } i_copy(window_array[window_num].display_image,
     window_array[window_num].big_image,
     0,
     NULL);

}

/****************************************************************************
  update_window
****************************************************************************/
void update_window(window_num)
   int window_num;
{
  if (window_array[window_num].type == 1)
    update_weight_window(window_num);
  else if (window_array[window_num].type == 2)
    update_act_window(window_num);
  else if (window_array[window_num].type == 3)
    update_target_window(window_num);
}

/****************************************************************************
  add_window
****************************************************************************/
void add_window() { int window_num = 0;
  int group = 1;
  int rows, cols;
  int row = 0;
  int col = 0;
  int direction = 0;
  int single_unit_index = -1;
  int get_index();
  SUBIMAGE small_bounds;
  int mag_factor;
  int row_start, col_start;
```

```
while (window_array[window_num].type != 0)
  window_num++;

window_array[window_num].type = 1;
get_int_defaut("Weight or Activation or Target Window? (1, 2, or 3)",
        &window_array[window_num].type);
if (window_array[window_num].type == 1) {
  get_int_defaut("Will display show weights going into or out of a single unit? (0 or 1)",
        &direction);
  while (single_unit_index == -1) {
    get_int_defaut("Group number of single unit?", &group);
    get_int_defaut("Row of single unit?", &row);
    get_int_defaut("Col of single unit?", &col);
    single_unit_index = get_index(group, row, col);
  }
  get_int_defaut("Group number of projecting units?", &group);
  get_rows_cols(group,
        &window_array[window_num].rows,
        &window_array[window_num].cols);
  get_int_defaut("Number of rows to display?", &window_array[window_num].rows);
  get_int_defaut("Number of cols to display?", &window_array[window_num].cols);
  fill_weight_window_pointers(window_num, group, single_unit_index, direction);
} else if ((window_array[window_num].type == 2) ||
    (window_array[window_num].type == 3)) {
  get_int_defaut("Group number of units to display?",
        &group);
  get_rows_cols(group,
        &window_array[window_num].rows,
        &window_array[window_num].cols);
  get_int_defaut("Number of rows to display?", &window_array[window_num].rows);
  get_int_defaut("Number of cols to display?", &window_array[window_num].cols);
  window_array[window_num].pattern = 0;
  if (window_array[window_num].type == 2) {
    get_int_defaut("Pattern to display acts on?", &window_array[window_num].pattern);
  }
  else if (window_array[window_num].type == 3) {
    get_int_defaut("Pattern to display targets on?", &window_array[window_num].pattern);
  }
  fill_unit_window_pointers(window_num, group);
}
get_display_params(window_num,
        &small_bounds.rs,
        &small_bounds.re,
        &small_bounds.cs,
        &small_bounds.ce,
        &mag_factor,
        &row_start,
        &col_start);
make_display_images(window_num,
        small_bounds,
        mag_factor,
        row_start,
        col_start);

update_window(window_num);
}

/*****************************************************************
 mouse_on_window
*****************************************************************/
int mouse_on_window(row, col)
  int *row, *col;
{
  int current_window;
  int window_num = -1;
  int display_rs, display_re, display_cs, display_ce;

i_getpos(dis, row, col, NULL);
  for (current_window = 0; current_window < MAX_WINDOWS; current_window++)
    if (window_array[current_window].type != 0) {
      display_rs = window_array[current_window].display_bounds.rs;
      display_re = window_array[current_window].display_bounds.re;
```

```c
  display_cs = window_array[current_window].display_bounds.cs;
  display_ce = window_array[current_window].display_bounds.ce;
  if (((*row > display_rs) &&
    (*row < display_re) &&
    (*col > display_cs) &&
    (*col < display_ce)) {
   window_num = current_window;

break;
    }
   }
  return(window_num);
 }

/*******************************************************************
  delete_window
********************************************************************/
void delete_window() { int mouse_on_window();
  int window_num = -1;
  int dis_row, dis_col;

while (window_num == -1) {
    printf("Mouse on window\n");
    window_num = mouse_on_window(&dis_row, &dis_col);
  }
  window_array[window_num].type = 0;
  window_array[window_num].pattern = 0;
  window_array[window_num].rows = 0;
  window_array[window_num].cols = 0;
  i_scrap(window_array[window_num].small_image, NULL);
  i_mcfillimg(dis, background_color);
  update_display();
}

/*******************************************************************
  save_display
********************************************************************/
void save_display() { char file[100];
  SUBIMAGE bounds;
  IMAGE *dump_image;

printf("File to dump display image to: ");
  scanf("%s", file);

bounds.rs = i_rstart(dis);
  bounds.cs = i_cstart(dis);
  bounds.re = i_rend(dis);
  bounds.ce = i_cend(dis);

dump_image = i_mcreat(file, IM_COLOR, IM_UNSIGNED, 8, bounds, NULL);
  i_copy(dump_image, dis, 0, NULL);
  i_close(dump_image, NULL);
}

/*******************************************************************
  read_display
********************************************************************/
void read_display(file)
   char file[100];
{
  int window_num;

SUBIMAGE small_bounds;
 int mag_factor;
 int row_start, col_start;

READ(window_array, file, MAX_WINDOWS * sizeof(struct window_type));

for (window_num = 0; window_num < MAX_WINDOWS; window_num++)
   if (window_array[window_num].type != 0) {
     small_bounds.rs = small_bounds.cs = 0;
```

```
    small_bounds.re = window_array[window_num].rows - 1;
    small_bounds.ce = window_array[window_num].cols - 1;
    mag_factor = (int)((window_array[window_num].display_bounds.ce -
                window_array[window_num].display_bounds.cs + 1) /
                (small_bounds.ce - small_bounds.cs + 1));
    row_start = window_array[window_num].display_bounds.rs;
    col_start = window_array[window_num].display_bounds.cs;
    make_display_images(window_num,
                small_bounds,
                mag_factor,
                row_start,
                col_start);
  }
  update_display();
}

/*************************************************************
write_display
*************************************************************/
void write_display(file)
char file[100];
{
  WRITE(window_array, file, MAX_WINDOWS * sizeof(struct window_type));
}

/*************************************************************
update_display
*************************************************************/
void update_display() { int window_num;

for (window_num = 0; window_num < MAX_WINDOWS; window_num++)
    if (window_array[window_num].type != 0)
      update_window(window_num);
}

/*************************************************************
get_box_info
*************************************************************/
int get_box_info(window_num, dis_row, dis_col, index, row, col)
    int window_num, dis_row, dis_col, *index, *row, *col;
{
  float pixels_per_unit;

pixels_per_unit = (float)(window_array[window_num].display_bounds.ce -
                window_array[window_num].display_bounds.cs) /
                window_array[window_num].cols;

*row = (int)((dis_row - window_array[window_num].display_bounds.rs) / pixels_per_unit);
  *col = (int)((dis_col - window_array[window_num].display_bounds.cs) / pixels_per_unit);

*index = window_array[window_num].window[*row][*col];
  return(1);
}

/*************************************************************
query_conn
*************************************************************/
void query_conn(window_num, dis_row, dis_col)
    int window_num, dis_row, dis_col;
{
  int index, row, col;

get_box_info(window_num, dis_row, dis_col, &index, &row, &col);
  printf("Weight of conn from group %d unit (%d %d) to group %d unit (%d %d)",
        conn[index].from->group,
        conn[index].from->row,
        conn[index].from->col,
        conn[index].to->group,
        conn[index].to->row,
        conn[index].to->col);
  get_float_default(" = ", &conn[index].weight);
}
```

```
/******************************************************************
 query_unit
 ******************************************************************/
void query_unit(window_num, dis_row, dis_col)
    int window_num, dis_row, dis_col;
{
  int index, row, col;

get_box_info(window_num, dis_row, dis_col, &index, &row, &col);
  printf("Act of unit (%d %d) in group %d on pattern %d is %.3f\n",
      unit[index].row,
      unit[index].col,
      unit[index].group,
      window_array[window_num].pattern,
      unit[index].output[window_array[window_num].pattern]);
  if (unit[index].flavor == 2)
    printf("Target of unit (%d %d) in group %d on pattern %d is %.3f\n",
      unit[index].row,
      unit[index].col,
      unit[index].group,
      window_array[window_num].pattern,
      unit[index].target[window_array[window_num].pattern]);
}

/******************************************************************
 query_net
 ******************************************************************/
void query_net() {
  int window_num;
  int dis_row, dis_col;
  int last_row = 100, last_col = 100;

printf("mouse on connection or unit\n");
  window_num = mouse_on_window(&dis_row, &dis_col);
  if (window_num != -1) {
    if (window_array[window_num].type == 1)
      query_conn(window_num, dis_row, dis_col);
    else if ((window_array[window_num].type == 2) ||
         (window_array[window_num].type == 3))
      query_unit(window_num, dis_row, dis_col);
    else
      window_num = -1;
  }
  while (window_num != -1) {
    if ((dis_row == last_row) && (dis_col == last_col))
      update_window(window_num);
    last_row = dis_row;
    last_col = dis_col;
    printf("mouse on connection or unit\n");
    window_num = mouse_on_window(&dis_row, &dis_col);
    if (window_num != -1)
      if (window_array[window_num].type == 1)
        query_conn(window_num, dis_row, dis_col);
      else if ((window_array[window_num].type == 2) ||
           (window_array[window_num].type == 3))
        query_unit(window_num, dis_row, dis_col);
      else
        window_num = -1;
  }
}

/******************************************************************
 hand_mark_conns
 ******************************************************************/
void hand_mark_conns() { int window_num;
  int dis_row, dis_col;
  int last_row = 100, last_col = 100;
  int index, row, col;

printf("mouse on connection\n");
  window_num = mouse_on_window(&dis_row, &dis_col);
  if ((window_num != -1) && (window_array[window_num].type == 1))
```

```
    get_box_info(window_num, dis_row, dis_col, &index, &row, &col);
  else
    window_num = -1;

while (window_num != -1) {
    if ((dis_row == last_row) && (dis_col == last_col))
      update_window(window_num);
    last_row = dis_row;
    last_col = dis_col;
    pruned_conns[index] = 1;
    window_array[window_num].window[row][col] = -1;

printf("mouse on connection\n");
    window_num = mouse_on_window(&dis_row, &dis_col);
    if ((window_num != -1) && (window_array[window_num].type == 1))
      get_box_info(window_num, dis_row, dis_col, &index, &row, &col);
    else
      window_num = -1;
  }
}

/*********************************************************************
change_unit_display_pattern
*********************************************************************/
void change_unit_display_pattern() { int one_pattern = 0;
  int window_num;
  int dis_row, dis_col;
  int pattern = 0;

get_int_defaut("Change all or one unit window patterns? (0 or 1)", &one_pattern);
  get_int_defaut("Pattern to display: ", &pattern);

if (one_pattern) {
    printf("mouse on act display\n");
    window_num = mouse_on_window(&dis_row, &dis_col);
    if ((window_num != -1) && ((window_array[window_num].type == 2) ||
                (window_array[window_num].type == 3))) {
      get_int_defaut("Pattern to display: ", &window_array[window_num].pattern);
      update_window(window_num);
    }
  }
  else {
    for (window_num = 0; window_num < MAX_WINDOWS; window_num++)
      if ((window_num != -1) && ((window_array[window_num].type == 2) ||
                  (window_array[window_num].type == 3))) {
        window_array[window_num].pattern = pattern;
        update_window(window_num);
      }
  }

}

/*********************************************************************
fix_display_after_pruning
*********************************************************************/
void fix_display_after_pruning() { int window_num;
  int row, col;
  int old_index;

for (window_num = 0; window_num < MAX_WINDOWS; window_num++)
    if (window_array[window_num].type == 1) {
      for (row = 0; row < window_array[window_num].rows; row++)
        for (col = 0; col < window_array[window_num].cols; col++) {
          old_index = window_array[window_num].window[row][col];
          if (old_index == -1)
            window_array[window_num].window[row][col] = -1; /* stay pruned */
          else
            window_array[window_num].window[row][col] =
              permute_list[old_index];
```

```c
    }
  }
  update_display();
} endif
include <stdio.h>
include <math.h>
#include <signal.h>
#include "constants.h"
#include "structures.h"
#include "globals.h"

/*****************************************************************
  load_network
*****************************************************************/
void load_network(networkfp, noisy)
   FILE *networkfp;
   int noisy;
{
  int i,n,m, group;
  int index, row, col;

fscanf(networkfp, "%d units", &n_units);
  check_max(n_units, MAX_UNITS, "units");
  if (noisy)
    printf("%d units\n", n_units);
  for (i = 0; i < n_units; i++) {
    unit[i].flavor = 0;
    unit[i].num_inputs = 0;
  } fscanf(networkfp, "%d inputs", &n_inputs);
  check_max(n_inputs, MAX_INPUTS, "inputs");
  if (noisy)
    printf("%d inputs\n", n_inputs);
  for (i = 0; i < n_inputs; i++) {
        fscanf(networkfp, "%d %d %d %d", &index, &group, &row, &col);
    input_index[i] = index;
    unit[index].index = index;
        unit[index].flavor = 1;
    unit[index].group = group;
    unit[index].row = row;
    unit[index].col = col;
  } fscanf(networkfp, "%d hiddens", &n_hiddens);
  check_max(n_hiddens, MAX_HIDDENS, "hiddens");
  if (noisy)
    printf("%d hiddens\n", n_hiddens);
  for (i = 0; i < n_hiddens; i++) {
        fscanf(networkfp, "%d %d %d %d", &index, &group, &row, &col);
    hidden_index[i] = index;
    unit[index].index = index;
        unit[index].flavor = 0;
    unit[index].group = group;
    unit[index].row = row;
    unit[index].col = col;
    unit[index].error = (float *)malloc(MAX_PATTERNS * sizeof(float));
  } fscanf(networkfp, "%d outputs", &n_outputs);
  check_max(n_outputs, MAX_OUTPUTS, "outputs");
  if (noisy)
    printf("%d outputs\n", n_outputs);
  for (i = 0; i < n_outputs; i++) {
        fscanf(networkfp, "%d %d %d %d", &index, &group, &row, &col);
    output_index[i] = index;
    unit[index].index = index;
        unit[index].flavor = 2;
    unit[index].group = group;
    unit[index].row = row;
    unit[index].col = col;
    unit[index].error = (float *)malloc(MAX_PATTERNS * sizeof(float));
```

```c
    unit[index].target = (float *)malloc(MAX_PATTERNS * sizeof(float));
  } yoking_flag = 0;
  fscanf(networkfp, "%d conns", &n_conns);
  check_max(n_conns, MAX_CONNS, "conns");
  if (noisy)
    printf("%d conns\n", n_conns);
  for (i = 0; i < n_conns; i++) {
          fscanf(networkfp, "%d %d %d", &n, &m, &group);
          conn[i].from = &unit[n];
          conn[i].to   = &unit[m];
    unit[m].num_inputs++;  /* increment input weight counter */
          conn[i].yoke_group = group;
    if (group >= 0)
      yoking_flag = 1;  /* indicate the network has yoking */
  } for (i=0;i<n_conns;i++) {
  /* tell each conn how my brothers it has, for LRC calculation */
  conn[i].num_inputs = conn[i].to->num_inputs;
  } fclose(networkfp);
}

/***************************************************************
  set_default_parameters
***************************************************************/
void set_default_parameters() {
  epsilon = 0.0;
  momentum = 0.7;
  decay_rate = 0.0;
  tolerance = 0.1;
  weight_update_interval = n_patterns;
  checkpoint_interval = 1000;

#ifdef DISPLAY
  strcpy(display_device, "c:dis");
  display_update_interval = 10;
#endif
  percent_to_prune = 0.1;
}

/***************************************************************
  init_working_arrays
***************************************************************/
void init_working_arrays() {
  struct conn_type *c,*clim;

total_error = 0.0;
  error_patterns = 0;
  for (c = conn,clim=conn+n_conns; c < clim; c++) {
    c->dweight = 0.0;
    c->gradweight = 0.0;
    c->prevgradweight = 0.0;
  }
}

/***************************************************************
  signal_handler
***************************************************************/
void signal_handler() { suspend = 1;
}

/***************************************************************
  enable_interrupts
***************************************************************/
void enable_interrupts() { void signal_handler();
```

```
    signal(SIGINT, signal_handler);
}

/*******************************************************************
disable_interrupts
*******************************************************************/
void disable_interrupts() { void signal_handler();

signal(SIGINT, SIG_DFL);
}

/*******************************************************************
initialize
*******************************************************************/
void initialize()
{
  FILE *weightfp, *paramfp;
  FILE *foofp;

make_sigmoid_table();

srandom(SEED);

load_network(networkfp, 1);

if ((weightfp = fopen(add_ext(root,".wet"),"r")) != NULL) {
    printf("Using weight file %s\n", add_ext(root,".wet"));

read_weights(conn, weightfp);
  }
  else {
    printf("Using random weights\n");
    randomize_weights(conn);
  }
  if ((paramfp = fopen(add_ext(root,".param"),"r")) != NULL) {
    printf("Using param file %s\n", add_ext(root,".param"));
    read_parameters(paramfp);
  }
  else {
    printf("Warning: Parameters set to defaults\n");
    set_default_parameters();
  } ifdef DISPLAY
  if (use_display)
    initialize_display();
endif if (use_display)
    if ((foofp = fopen(add_ext(root,".lay"),"r")) != NULL) {
      printf("Using display file %s\n", add_ext(root, ".lay"));
      read_display(add_ext(root, ".lay"));
    } load_patterns(root);

init_working_arrays();
  use_bestguess = 0;
  bestguess_distance = 0;
  use_auto_pilot = 0;
}
include <stdio.h>
include <math.h>
#include "constants.h"
#include "structures.h"
#include "globals.h"

/*******************************************************************
read_parameters
*******************************************************************/
void read_parameters(paramfp)
    FILE *paramfp;
```

```c
{
  fscanf(paramfp, "Epsilon = %f\n", &epsilon);
  fscanf(paramfp, "Momentum = %f\n", &momentum);
  fscanf(paramfp, "Decay Rate = %f\n", &decay_rate);
  fscanf(paramfp, "Tolerance = %f\n", &tolerance);
  fscanf(paramfp, "Weight Update Interval = %d\n", &weight_update_interval);
  fscanf(paramfp, "Checkpoint Interval = %d\n", &checkpoint_interval);
  fscanf(paramfp, "Prune Error Sacrifice = %f\n", &prune_error_sacrifice);
#ifdef DISPLAY
  fscanf(paramfp, "Use Display = %d\n", &use_display);
  fscanf(paramfp, "Display Device = %s\n", display_device);
  fscanf(paramfp, "Display Update Interval = %d\n", &display_update_interval);
#endif
  fclose(paramfp);
}

/*****************************************************************
  set_parameters
*****************************************************************/
void set_parameters() {
  get_float_defaut("Epsilon: ", &epsilon);
  get_float_defaut("Momentum: ", &momentum);
  get_float_defaut("Decay Rate: ", &decay_rate);
  get_float_defaut("Tolerance: ", &tolerance);
  get_int_defaut("Weight Update interval: ", &weight_update_interval);
  get_int_defaut("Checkpoint interval: ", &checkpoint_interval);
  get_float_defaut("Prune Error Sacrifice", &prune_error_sacrifice);
#ifdef DISPLAY
  get_int_defaut("Display Update Interval: ", &display_update_interval);
#endif
}

/*****************************************************************
  toggle_use_bestguess
*****************************************************************/
void toggle_use_bestguess() {
  use_bestguess = !use_bestguess;
  if (use_bestguess) printf("\n using bestguess. \n");
  else printf("\n not using bestguess. \n");
}

/*****************************************************************
  change_bestguess_distance
*****************************************************************/
void change_bestguess_distance() { get_int_defaut("Bestguess distance: ", &bestguess_distance);
}

/*****************************************************************
  toggle_use_auto_pilot
*****************************************************************/
void toggle_use_auto_pilot() {
  use_auto_pilot = !use_auto_pilot;
  if (use_auto_pilot) printf("\n using auto_pilot. \n");
  else printf("\n not using auto_pilot. \n");
}

/*****************************************************************
  avg_weight
*****************************************************************/
void avg_weight() {
  int i;
  float sum = 0;
  for (i=0;i<n_conns;i++)
    sum += FABS(conn[i].weight);
  printf("average weight = %g\n", sum / n_conns);
}
```

```
/******************************************************************
   query_hand_surgery
******************************************************************/
ifdef DISPLAY void query_hand_surgery() { char c[50];

printf("\n");
  printf("  alter unit display pattern\n");
  printf("  query network\n");
  printf("  connection pruning\n");
/* printf("  unit pruning\n"); */
  printf("\n");
  printf("Enter choice > ");
  scanf("%s", c);
  eat_white_space_cr();
  if (c[0] == 'a')  change_unit_display_pattern();
  if (c[0] == 'q')  query_net();
  if (c[0] == 'c')  hand_prune_conns();
/* if (c[0] == 'u')  hand_prune_units(); */
}
endif /******************************************************************
   query_auto_surgery
******************************************************************/
void query_auto_surgery() { char c[50];

printf("\n");
  printf("  connection pruning\n");
/* printf("  unit pruning\n"); */
  printf("\n");
  printf("Enter choice > ");
  scanf("%s", c);
  eat_white_space_cr();
  if (c[0] == 'c')  auto_prune_conns();
/* if (c[0] == 'u')  auto_prune_units(); */
}

/******************************************************************
   query_surgery
******************************************************************/
void query_surgery() { char c[50];

printf("\n");
#ifdef DISPLAY
  printf("  hand surgery...\n");
#endif
  printf("  auto surgery...\n");
  printf("\n");
  printf("Enter choice > ");
  scanf("%s", c);
  eat_white_space_cr();
#ifdef DISPLAY
  if (c[0] == 'h')  query_hand_surgery();
#endif
  if (c[0] == 'a')  query_auto_surgery();
}

/******************************************************************
   query_display
******************************************************************/
ifdef DISPLAY void query_display() {
```

```c
    char  c[50];
    char  file[FILENAMELEN];

printf("\n");
    printf("  add window\n");
    printf("  delete window\n");
    printf("  change unit display pattern\n");
    printf("  query network\n");
    printf("  save display image\n");
    printf("  read display\n");
    printf("  write display\n");
    printf("  update display\n");
    printf("\n");
    printf("Enter choice > ");
    scanf("%s", c);
    eat_white_space_cr();
    if (c[0] == 'a')   add_window();
    if (c[0] == 'd')   delete_window();
    if (c[0] == 'c')   change_unit_display_pattern();
    if (c[0] == 'q')   query_net();
    if (c[0] == 's')   save_display();
    if (c[0] == 'r')   read_display(prompt_string("Display file to read: ", file));
    if (c[0] == 'w')   write_display(prompt_string("Display file to write: ", file));
    if (c[0] == 'u')   update_display();
}
endif /*************************************************************
  query_other
*************************************************************/
void query_other() {
    char  c[50];

printf("\n");
    printf("  average weights\n");
    printf("  randomize weights\n");
    printf("  error patterns\n");
    printf("  dump states\n");
    printf("  bestguess\n");
    printf("  change bestguess distance\n");
    printf("  pilot\n");
    printf("\n");
    printf("Enter choice > ");
    scanf("%s", c);
    eat_white_space_cr();
    if (c[0] == 'a')   avg_weight();
    if (c[0] == 'r')   {printf("randomizing weights\n"); randomize_weights(conn);}
    if (c[0] == 'e')   print_error_patterns();
    if (c[0] == 'd')   dump_states(prompt_file("Dump file to write: ","w"));
    if (c[0] == 'b')   toggle_use_bestguess();
    if (c[0] == 'c')   change_bestguess_distance();
    if (c[0] == 'p')   toggle_use_auto_pilot();
}

/*************************************************************
  query_read
*************************************************************/
void query_read() { char  c[50];
    char  file[FILENAMELEN];

printf("\n");
    printf("  environment\n");
    printf("  weights\n");
#ifdef DISPLAY
    printf("  display\n");
#endif
    printf("  network architecture\n");
    printf("\n");
    printf("Enter choice > ");
    scanf("%s", c);
    eat_white_space_cr();
    if (c[0] == 'e')   load_patterns(prompt_string("Pattern file to read: ", file));
    if (c[0] == 'w')   read_weights(conn,
```

```
                    prompt_file("Weight file to read: ","r"));
#ifdef DISPLAY
  if (c[0] == 'd')   read_display(prompt_string("Display file to read: ", file));
#endif
  if (c[0] == 'n')   load_network(prompt_file("Net file to read: ","r"), 1);
}

/****************************************************************
  query_write
****************************************************************/
void query_write() {
  char  c[50];

char  file[FILENAMELEN];

printf("\n");
  printf("  environment\n");
  printf("  weights\n");
  printf("  states\n");
#ifdef DISPLAY
  printf("  display parameters\n");
  printf("  image from display\n");
#endif
  printf("  network architecture\n");
  printf("\n");
  printf("Enter choice > ");
  scanf("%s", c);
  eat_white_space_cr();
  if (c[0] == 'e')   write_environment();
  if (c[0] == 'w')   write_weights(conn,
                       prompt_file("Weight file to write: ","w"));
  if (c[0] == 's')   dump_states(prompt_file("Dump file to write: ","w"));
#ifdef DISPLAY
  if (c[0] == 'd')   write_display(prompt_string("Display file to write: ", file));
  if (c[0] == 'i')   save_display();
#endif
  if (c[0] == 'n')   write_net(prompt_file("Network file to write: ","w"));
}

/****************************************************************
  query_user
****************************************************************/
void query_user() {
  char  c[50];

disable_interrupts();

printf("\n");
  do {
    printf("  parameters...\n");
    printf("  read...\n");
    printf("  write...\n");
#ifdef DISPLAY
    printf("  display...\n");
#endif
    printf("  surgery...\n");
    printf("  other...\n");
    printf("  go\n");
    printf("  quit\n");
    printf("\n");
    printf("Enter choice > ");
    scanf("%s", c);
    eat_white_space_cr();
    if (c[0] == 'p')   set_parameters();
    if (c[0] == 'r')   query_read();
    if (c[0] == 'w')   query_write();
#ifdef DISPLAY
    if (c[0] == 'd')   query_display();
#endif
    if (c[0] == 's')   query_surgery();
    if (c[0] == 'o')   query_other();
    if (c[0] == 'q')   exit(0);
  } while (c[0] != 'g');
  printf("number of iterations: ");
```

```
scanf("%d", &ennuvits);
eat_white_space_cr();

enable_interrupts();
}

/***************************************************************
output_stats
***************************************************************/
void output_stats() { printf("\n%d. %f ", epoch, (total_error / n_patterns));
  printf("%f ", prevgrad);
  printf("%f ", (sqrt(gradlensum) / n_patterns));
  printf("%d ", error_patterns);
  printf("%.3f %.3f ", epsilon, momentum);
  total_error = 0.0;
  error_patterns = 0;
}

/***************************************************************
print_error_patterns
***************************************************************/
void print_error_patterns() { int pat;

for (pat = 0; pat < n_patterns; pat++) {
    if (use_bestguess) {
      if (!best_guessp(pat))
        printf("%d ", pat);
    }
    else /* not using bestguess */
      if (max_pattern_error[pat] > tolerance)
        printf("%d ", pat);
  }
  printf("\n");
}

/***************************************************************
dump_states
***************************************************************/
void dump_states(dumpfp)
    FILE *dumpfp;
{
  struct unit_type *u,*ulim;
  int pat;
  int npatterns = n_patterns;
  int stpattern = 0;
  int nunits = n_units;
  int stunit = 0;

get_int_default("number of patterns to dump: ", &npatterns);
  get_int_default("first pattern to dump: ", &stpattern);
  get_int_default("number of units to dump: ", &nunits);
  get_int_default("first unit to dump: ", &stunit);
  fprintf(dumpfp, "%d units\n", nunits);
  fprintf(dumpfp, "%d patterns\n", n_patterns);
  sweep_forward(stpattern, stpattern + npatterns);
  for (pat = stpattern; pat < stpattern + npatterns; pat++) {
    for (u = unit+stunit,ulim=unit+stunit+nunits; u < ulim; u++)
      fprintf(dumpfp, "%f ",u->output[pat]);
    fprintf(dumpfp, "\n");
  }
  fclose(dumpfp);
}

/***************************************************************
read_weights
***************************************************************/
void read_weights(cstart, weightfp)
    struct conn_type *cstart;
```

```
  FILE *weightfp;
{
  struct conn_type *c,*clim;
  int n;

fscanf (weightfp, "%d epochs", &epoch);
  fscanf (weightfp, "%d weights", &n);
  if (n!=n_conns)
    printf("Wrong number of weights.\n");
  else
    for (c = cstart,clim=cstart+n_conns; c < clim; c++)
        fscanf(weightfp,"%f\n", &c->weight);
  fclose (weightfp);

#if DISPLAY
  update_display();
#endif
}

/**************************************************************************
  write_weights
**************************************************************************/
void write_weights(cstart, weightfp)
    struct conn_type *cstart;
    FILE *weightfp;
{
  struct conn_type *c,*clim;

fprintf (weightfp, "%d epochs\n", epoch);
  fprintf (weightfp, "%d weights\n", n_conns);
  for (c = cstart,clim=cstart+n_conns; c < clim; c++)
    fprintf(weightfp,"%f\n", c->weight);
  fclose (weightfp);
}

/**************************************************************************
  get_checkname
**************************************************************************/
void get_checkname()
{
  printf ("Checkpoint file to write: ");
  scanf ("%s", checkname);
  checknameflag = 1;
}

/**************************************************************************
  checkpoint_weights
**************************************************************************/
void checkpoint_weights(cstart)
    struct conn_type *cstart;
{
  struct conn_type *c,*clim;
  char namework[FILENAMELEN];
  FILE *checkfp;

if (onlinep)
    printf("\nCheckpointing...\n");
  if (!checknameflag)
    get_checkname();
  sprintf(namework, "%s.%d", checkname, epoch);
  checkfp = fopen (namework, "w");
  fprintf (checkfp, "%d epochs\n", epoch);
  fprintf (checkfp, "%d weights\n", n_conns);
  for (c = cstart,clim=cstart+n_conns; c < clim; c++)
    fprintf(checkfp,"%f\n", c->weight);
  fclose (checkfp);
}

/**************************************************************************
```

```c
/************************************
read_binary_patterns
************************************/
void read_binary_patterns(patternfp)
FILE *patternfp;
{
  int i,j,k,n;
  int ok = 1;

fread (&n, sizeof(float), 1, patternfp);
  if (n!=n_inputs) {
    printf("Wrong number of inputs.\n");
    ok=0;
  }
  fread (&n, sizeof(float), 1, patternfp);
  if (n!=n_outputs) {
    printf("Wrong number of outputs.\n");
    ok=0;
  } fread (&n, sizeof(float), 1, patternfp);
  n_patterns = n;
  check_max(n_patterns,MAX_PATTERNS,"patterns");
  printf("%d patterns\n", n_patterns);

if (ok) {
    for (i = 0; i < n_patterns; i++) {
      fread (casebuf, sizeof(float), n_inputs+n_outputs, patternfp);
      k=0;
      for (j = 0; j < n_inputs; j++)
        unit[input_index[j]].output[i] = casebuf[k++];
      for (j = 0; j < n_outputs; j++)
        unit[output_index[j]].target[i] = casebuf[k++];
    }
  }
}

/************************************
read_ascii_patterns
************************************/
void read_ascii_patterns(patternfp)
FILE *patternfp;
{
  int i,j,n;
  int ok = 1;

fscanf (patternfp, "%d inputs", &n);
  if (n!=n_inputs) {
    printf("Wrong number of inputs.\n");
    ok=0;
  }
  fscanf (patternfp, "%d outputs", &n);
  if (n!=n_outputs) {
    printf("Wrong number of outputs.\n");
    ok=0;
  }
  fscanf (patternfp, "%d patterns", &n_patterns);
  check_max(n_patterns,MAX_PATTERNS,"patterns");
  printf("%d patterns\n", n_patterns);

if (ok) {
    for (i = 0; i < n_patterns; i++) {
      for (j = 0; j < n_inputs; j++)
        fscanf (patternfp, "%f", &unit[input_index[j]].output[i]);
      for (j = 0; j < n_outputs; j++)
        fscanf (patternfp, "%f", &unit[output_index[j]].target[i]);
    }
  }
}

/************************************
after_reading_patterns
************************************/
void after_reading_patterns() {
  current_pattern = 0;
}
```

```
/***************************************************************
 load_patterns
 ***************************************************************/
void load_patterns(base)
    char *base;
{
 FILE *patternfp;
 int c,found=0;
 char temp[100];

while (!found) {
        found = 1;
        if ((patternfp = fopen(add_ext(base,".bin"),"r")) != NULL)
    printf("Using environment file %s\n", add_ext(base,".bin"));
        else if ((patternfp = fopen(add_ext(base,".env"),"r")) != NULL)
    printf("Using environment file %s\n", add_ext(base,".env"));
        else {
    found = 0;
    strcpy(temp, add_ext(base, ".bin"));
    printf ("Unable to find %s or %s\n",
            temp, add_ext(base,".env"));
    printf ("\nEnvironment file (%s): ", base);
    scanf ("%s", base);
        }
 }
 c = getc (patternfp);
 if (c == 2)
        read_binary_patterns (patternfp);
 else {
        ungetc (c, patternfp);
        read_ascii_patterns (patternfp);
 }
 fclose (patternfp);
 after_reading_patterns();
}

/***************************************************************
 write_environment
 ***************************************************************/
void write_environment()
{
 int i,j,k;
 int dump_freq = 1;
 int num_to_flag = n_patterns;
 int num_flagged = 0;
 int flag_buffer[MAX_PATTERNS];
 int dump_nodump = 0;
 int num_to_dump;
 FILE *patternfp = prompt_file("Environment file to write: ","w");

srandom(SEED);
 get_int_default("number of patterns to flag: ", &num_to_flag);
 get_int_default("dump or don't dump flagged patterns? (0 or 1) ", &dump_nodump);

for (i = 0; i < n_patterns; i++)
    flag_buffer[i] = 0;

while (num_flagged < num_to_flag) {
  if (num_to_flag == n_patterns)
    flag_buffer[num_flagged] = 1;
   else {
    i = RAND_INT(0, n_patterns - 1);
    while (flag_buffer[i] != 0)
      i = RAND_INT(0, n_patterns - 1);
    flag_buffer[i] = 1;
   }
   num_flagged++;
 }
 putc('\002', patternfp);
 fwrite (&n_inputs, sizeof(float), 1, patternfp);
 fwrite (&n_outputs, sizeof(float), 1, patternfp);
 if (dump_nodump == 0)
   num_to_dump = num_to_flag;
 else
   num_to_dump = n_patterns - num_to_flag;
 fwrite (&num_to_dump, sizeof(float), 1, patternfp);
```

```
for (i = 0; i < n_patterns; i++) {
 if (((dump_nodump == 0) && (flag_buffer[i] == 1)) ||
     ((dump_nodump == 1) && (flag_buffer[i] == 0))) {
  k=0;
  for (j = 0; j < n_inputs; j++)
   casebuf[k++] = unit[input_index[j]].output[i];
  for (j = 0; j < n_outputs; j++)
   casebuf[k++] = unit[output_index[j]].target[i];
  fwrite (casebuf, sizeof(float), n_inputs+n_outputs, patternfp);
 }
} fclose (patternfp);
}

/***********************************************************
 write_net
***********************************************************/
void write_net(netfp)
 FILE *netfp;
{
 int cur_unit;
 int cur_conn;
 int index;

fprintf(netfp, "%d units\n", n_units);
 fprintf(netfp, "%d inputs\n", n_inputs);
 for (cur_unit = 0; cur_unit < n_inputs; cur_unit++) {
  index = input_index[cur_unit];
  fprintf(netfp, "%d %d %d %d\n",
      index,
      unit[index].group,
      unit[index].row,
      unit[index].col);
 }
 fprintf(netfp, "\n");

fprintf(netfp, "%d hiddens\n", n_hiddens);
 for (cur_unit = 0; cur_unit < n_hiddens; cur_unit++) {
  index = hidden_index[cur_unit];
  fprintf(netfp, "%d %d %d %d\n",
      index,
      unit[index].group,
      unit[index].row,
      unit[index].col);
 }
 fprintf(netfp, "\n");

fprintf(netfp, "%d outputs\n", n_outputs);
 for (cur_unit = 0; cur_unit < n_outputs; cur_unit++) {
  index = output_index[cur_unit];
  fprintf(netfp, "%d %d %d %d\n",
      index,
      unit[index].group,
      unit[index].row,
      unit[index].col);
 }
 fprintf(netfp, "\n");

fprintf(netfp, "%d conns\n", n_conns);
 for (cur_conn = 0; cur_conn < n_conns; cur_conn++) {
  fprintf(netfp, "%d %d %d\n",
      conn[cur_conn].from->index,
      conn[cur_conn].to->index,
      conn[cur_conn].yoke_group);
 } fclose (netfp);
} include <stdio.h>
include <math.h>
#include "constants.h"
#include "structures.h"
#include "globals.h"
```

```
/************************************************
 main
 ************************************************/
main(argc, argv)
   int argc;
   char *argv[];
{
   int iteration;

if (argc != 2)
      punt("Usage: ebp netfile", NULL);
   root = argv[1];
   if ((networkfp = fopen(root, "r")) == NULL) {
          if ((networkfp = fopen(add_ext(root,".net"), "r")) == NULL)
          punt("ebp: can't open %s or %s", root, add_ext(root, ".net"));
   }
   initialize();
   while (1) {
      query_user();
      suspend = 0;
      for (iteration = 1; (iteration <= ennuvits && suspend == 0); iteration++, epoch++) {
         do_epoch();
         if (0 == epoch % checkpoint_interval)
            checkpoint_weights(conn);
#ifdef DISPLAY
         if (0 == epoch % display_update_interval)
            update_display();
#endif
      }
   }
}

/* This program allows you to interactively create .net files for networks
   with arbitrary number of 2-D layers.
*/ include <stdio.h> define RAND_FLOAT(min, max)  ((random() % 10000) * (((max) - (min)) / 10000.0) + (min))
define MIN_GROUPS  2     /* minimum number of groups of units */
#define MAX_GROUPS  20    /* maximum number of groups of units */
#define MAX_DIM     128   /* maximum dimension (# rows or cols) of a group */
#define MAX_CONNS   50000 /* maximum # of connections in network */
define SEED        10    /* random seed */ struct group_type {
   int  group_num;        /* number of this group */
   int  group_type;       /* 0 means input group,
                             1 means hidden group,
                             2 means output group */
   int  num_rows;         /* number of rows in this group */
   int  num_cols;         /* number of cols in this group */
   int  first_unit_num;   /* the global index of the first unit in this
                             group */
};

FILE *headerfp;      /* file pointer for header file */
FILE *connfp;        /* file pointer for connection file */ struct group_type *group_list[MAX_GROUPS];  /* list of groups */ int num_conns = 0;      /* number of connections in network */
int num_unit_groups;    /* number of groups of units (usually layers) but
                           if for instance, the retina is divided into 3
                           parts, each part would be a seperate group */
int num_inputs = 1;     /* number of input units, the 1 is for the bias */
int num_hiddens = 0;    /* number of hidden units */
int num_outputs = 0;    /* number of output units */
int current_unit = 1;   /* the next available unit number 0 is reserved
                           for the bias unit */
int current_yoking_group = 0;  /* index for current yoking group */
int next_yoking_group = 0;     /* index for next yoking group to be used */
```

```
/************************************************************
 my_getint
*************************************************************/
int my_getint(prompt, min, max, def)
    char *prompt;
    int min, max, def;
{
  char input[10];
  int ok = 0;
  int value;

while (!ok) {
    ok = 1;
    printf("%s (%d, %d, %d) > ", prompt, min, max, def);
    scanf("%s", input);
    if (input[0] == '\n')
      value = def;
    else
      value = atoi(input);
  }
  return(value);
}

/************************************************************
 add_bias_group
*************************************************************/
add_bias_group() { struct group_type *group;

group_list[0] = group =
    (struct group_type *)(malloc(sizeof(struct group_type)));
  group->group_num = 0;
  group->group_type = 0; /* input group */
  group->num_rows = 1;
  group->num_cols = 1;
  group->first_unit_num = 0;
}

/************************************************************
 add_input_group
*************************************************************/
add_input_group(group_num)
    int group_num;
{
  int num_rows, num_cols;
  struct group_type *group;
  int unit;

group_list[group_num] = group =
    (struct group_type *)(malloc(sizeof(struct group_type)));

group->group_num = group_num;
  group->group_type = 0; /* input group */
  group->num_rows = num_rows =
    my_getint("Number of rows in this input group?", 1, 256, 30);
  group->num_cols = num_cols =
    my_getint("Number of cols in this input group?", 1, 256, 32);
  group->first_unit_num = current_unit;

current_unit += num_rows * num_cols;
  num_inputs += num_rows * num_cols;
}

/************************************************************
 add_retinal_conns
*************************************************************/
int add_retinal_conns(from_group_num,
          to_group_num,
          recep_rows,
```

```
                    recep_cols,
                    row_shift,
                    col_shift,
                    connectivity,
                    num_rows,
                    num_cols)
    int from_group_num, to_group_num;
    int recep_rows, recep_cols;
    int row_shift, col_shift;
    float connectivity;
    int *num_rows, *num_cols;
{
    struct group_type *from_group = group_list[from_group_num];
    struct group_type *to_group = group_list[to_group_num];
    int from_row, from_col;
    int to_row, to_col;
    int conns = 0;
    int use_yoking;
    int yoke_group;
    int new_yoking; /* 0 means these are new yoking groups, 1 means these
                       yokings should be numbered same as last */ use_yoking = my_getint("Use yoking?", 0, 1, 0);
    if (use_yoking) {
      new_yoking = my_getint("New yoking or same as last yoking? (1 = new)", 0, 1, 0);
      if (new_yoking)
        current_yoking_group = next_yoking_group;
    }

/* determine # of ver shifts */
    if (row_shift == 0) {
      /* no shifting of rows */
      *num_rows = 1;
    }
    else {
      *num_rows =
        ((from_group->num_rows - recep_rows) / row_shift) + 1;
    }

/* determine # of hor shifts */
    if (col_shift == 0) {
      /* no shifting of cols */
      *num_cols = 1;
    }
    else {
      *num_cols =
        ((from_group->num_cols - recep_cols) / col_shift) + 1;
    } for (to_row = 0; to_row < *num_rows; to_row++)
      for (to_col = 0; to_col < *num_cols; to_col++) {
        yoke_group = current_yoking_group;
        for (from_row = to_row * row_shift;
             from_row < (to_row * row_shift) + recep_rows;
             from_row++)
          for (from_col = to_col * col_shift;
               from_col < (to_col * col_shift) + recep_cols;
               from_col++) {
            if (RAND_FLOAT(0.0, 1.0) < connectivity) {
              fprintf(connfp, "%d %d ",
                  (from_group->first_unit_num +
                   from_row * from_group->num_cols +
                   from_col),
                  (to_group->first_unit_num +
                   to_row * (*num_cols) +
                   to_col));
              if (use_yoking)
                fprintf(connfp, "%d\n", yoke_group);
              else
                fprintf(connfp, "-1\n");
              conns++;
            }
          yoke_group++;
        }
      }
}
```

```
    if (use_yoking)
        next_yoking_group = yoke_group;

return(conns);
}

/****************************************************************
 add_full_conns
 ****************************************************************/
int add_full_conns(from_group, to_group, connectivity, yoking_group)
    int from_group, to_group;
    float connectivity;
    int yoking_group;
{
    int from_rows = group_list[from_group]->num_rows;
    int from_cols = group_list[from_group]->num_cols;
    int from_start_unit = group_list[from_group]->first_unit_num;
    int to_rows = group_list[to_group]->num_rows;
    int to_cols = group_list[to_group]->num_cols;
    int to_start_unit = group_list[to_group]->first_unit_num;
    int from_row, from_col, to_row, to_col;
    int conns = 0;

for (from_row = 0; from_row < from_rows; from_row++)
        for (from_col = 0; from_col < from_cols; from_col++)
            for (to_row = 0; to_row < to_rows; to_row++)
                for (to_col = 0; to_col < to_cols; to_col++)
                    if (RAND_FLOAT(0.0, 1.0) < connectivity) {
                        fprintf(connfp, "%d %d %d\n",
                            from_start_unit + from_row * from_cols + from_col,
                            to_start_unit + to_row * to_cols + to_col,
                            yoking_group);
                        conns++;
                    } return(conns);
}

/****************************************************************
 add_bias_conns
 ****************************************************************/
int add_bias_conns(to_group)
    int to_group;
{
    int yoked_biases;

yoked_biases = my_getint("Should bias conns be yoked for this layer?", 0, 1, 0);
    if (yoked_biases)
        return(add_full_conns(0, to_group, 1.0, next_yoking_group++));
    else
        return(add_full_conns(0, to_group, 1.0, -1));
}

/****************************************************************
 add_conns
 ****************************************************************/
add_conns(from_group, to_group)
    int from_group, to_group;
{
    char conn_type[20];
    int num_to_units;
    int recep_rows, recep_cols, row_shift, col_shift;
    int group_num, num_rows, num_cols;
    float connectivity;

printf("full or retinal connections between groups %d and %d > ",
        from_group,
        to_group);
    scanf("%s", conn_type);
    printf("Percent connectivity? (0.0 1.0) > ");
    scanf("%f", &connectivity);

/* reinitialize seed, so that two retinas going into one hidden layer
```

```
    with partial connectivity will have the same connectivity pattern */
if (connectivity < 1.0)
srandom(SEED);

if (conn_type[0] == 'f') {
 if (group_list[to_group]->num_rows == 0) {
  /* get size of group */
  num_to_units = my_getint("Enter # units in to group", 1, 10000, 1);
  group_list[to_group]->num_rows = 1;
  group_list[to_group]->num_cols = num_to_units;
  current_unit += num_to_units;
  if (group_list[to_group]->group_type == 2)
    num_outputs += num_to_units;
 }
 num_conns += add_full_conns(from_group, to_group, connectivity, -1);
}
else {
 printf("group %d has %d rows\n", from_group, group_list[from_group]->num_rows);
 recep_rows = my_getint("Enter # rows in receptive field of unit in this layer",
          1, MAX_DIM, 1);
 printf("group %d has %d cols\n", from_group, group_list[from_group]->num_cols);
 recep_cols = my_getint("Enter # cols in receptive field of unit in this layer",
          1, MAX_DIM, 1);
 row_shift = my_getint("Enter # rows to shift successive receptive fields",
          1, MAX_DIM, 1);
 col_shift = my_getint("Enter # cols to shift successive receptive field",
          1, MAX_DIM, 1);
 num_conns += add_retinal_conns(from_group,
          to_group,
          recep_rows,
          recep_cols,
          row_shift,
          col_shift,
          connectivity,
          &num_rows,
          &num_cols);
 if (group_list[to_group]->num_rows == 0) {
  /* get size of group */
  group_list[to_group]->num_rows = num_rows;
  group_list[to_group]->num_cols = num_cols;
  current_unit += num_rows * num_cols;
  if (group_list[to_group]->group_type == 2)
    num_outputs += num_rows * num_cols;
 }
 else if ((group_list[to_group]->num_rows != num_rows) ||
      (group_list[to_group]->num_cols != num_cols)) {
  printf("ERROR: I though group %d had %d rows and %d cols\n",
      to_group, group_list[to_group]->num_rows, group_list[to_group]->num_cols);
  printf("   But this retinal connectivity means it has %d rows and %d cols\n",
      num_rows, num_cols);
  exit(0);
 }
}
}

/***********************************************************************
 add_hidden_group
***********************************************************************/
add_hidden_group(group_num)
  int group_num;
{
 int num_rows, num_cols;
 struct group_type *group;
 int from_group;
 group_list[group_num] = group =
  (struct group_type *)(malloc(sizeof(struct group_type)));

group->group_num = group_num;
 group->group_type = 1; /* hidden group */
 group->first_unit_num = current_unit;
 group->num_rows = 0; /* initialize these to 0 */
 group->num_cols = 0; /* initialize these to 0 */ from_group =
  my_getint("Enter an earlier group with connects to this hidden layer (-1 when done)",
```

```
        -1, group_num - 1, 1);
    while (from_group != -1) {
      add_conns(from_group, group_num);
      from_group =
        my_getint("Enter an earlier group with connects to this hidden layer (-1 when done)",
          -1, group_num - 1, 1);
    }
    /* add bias connections */
    num_conns += add_bias_conns(group_num);
    num_hiddens += group->num_rows * group->num_cols;
}

/**************************************************************
  add_output_group
 **************************************************************/
add_output_group(group_num)
    int group_num;
{
  int num_rows, num_cols;
  struct group_type *group;
  int from_group;
  group_list[group_num] = group =
    (struct group_type *)(malloc(sizeof(struct group_type)));

group->group_num = group_num;
  group->group_type = 2; /* output group */
  group->first_unit_num = current_unit;
  group->num_rows = 0; /* initialize these to 0 */
  group->num_cols = 0; /* initialize these to 0 */ from_group =
    my_getint("Enter an earlier group with connects to this output layer (-1 when done)",
      -1, group_num - 1, 1);
  while (from_group != -1) {
    add_conns(from_group, group_num);
    from_group =
      my_getint("Enter an earlier group with connects to this output layer (-1 when done)",
        -1, group_num - 1, 1);
  }
  /* add bias connections */
  num_conns += add_bias_conns(group_num);
}

/**************************************************************
  get_net_description
 **************************************************************/
get_net_description() {
  int group;
  char level[20];

connfp = fopen("conns.txt", "w");
  num_unit_groups = my_getint("Number of groups of units?",
                MIN_GROUPS,
                MAX_GROUPS,
                3);
  /* create groups */
  /* group 0 is the bias unit, and hence has one unit */
  add_bias_group();
  for (group = 1; group <= num_unit_groups; group++) {
    printf("Is group %d an input, hidden or output group? > ", group);
    scanf("%s", level);
    if (level[0] == 'i')       add_input_group(group);
    else if (level[0] == 'h')  add_hidden_group(group);
    else if (level[0] == 'o')  add_output_group(group);
    else                       group--;
  }
}

/**************************************************************
  output_header
 **************************************************************/
output_header() {
```

```
int group_num;
struct group_type *current_group;
int row, col;
FILE *headerfp = fopen("header.txt", "w");

fprintf(headerfp, "%d units\n", current_unit);

fprintf(headerfp, "%d inputs\n", num_inputs);
fprintf(headerfp, "0 0 0 0\n"); /* add bias to list of input units */
for (group_num = 1; group_num < num_unit_groups; group_num++) {
  current_group = group_list[group_num];
  if (current_group->group_type == 0) {
    /* input unit */
    for (row = 0; row < current_group->num_rows; row++)
      for (col = 0; col < current_group->num_cols; col++)
        fprintf(headerfp, "%d %d %d %d\n",
            current_group->first_unit_num +
              row * current_group->num_cols +
              col,
            group_num,
            row,
            col);
  }
}
fprintf(headerfp, "\n");

fprintf(headerfp, "%d hiddens\n", num_hiddens);
for (group_num = 1; group_num <= num_unit_groups; group_num++) {
  current_group = group_list[group_num];
  if (current_group->group_type == 1) {
    /* hidden unit */
    for (row = 0; row < current_group->num_rows; row++)
      for (col = 0; col < current_group->num_cols; col++)
        fprintf(headerfp, "%d %d %d %d\n",
            current_group->first_unit_num +
              row * current_group->num_cols +
              col,
            group_num,
            row,
            col);
  }
}
fprintf(headerfp, "\n");
fprintf(headerfp, "%d outputs\n", num_outputs);
for (group_num = 1; group_num <= num_unit_groups; group_num++) {
  current_group = group_list[group_num];
  if (current_group->group_type == 2) {
    /* output unit */
    for (row = 0; row < current_group->num_rows; row++)
      for (col = 0; col < current_group->num_cols; col++)
        fprintf(headerfp, "%d %d %d %d\n",
            current_group->first_unit_num +
              row * current_group->num_cols +
              col,
            group_num,
            row,
            col);
  }
}
fprintf(headerfp, "\n");
fprintf(headerfp, "%d conns\n", num_conns);
}

/*******************************************************************
  main
*******************************************************************/
main(argc, argv)
int argc;
char *argv[];
{
  int     iteration;

if (argc != 2) {
    printf("Usage: make_net netfile\n");
    exit(0);
```

```
    }
    else {
        get_net_description();
        output_header();
        printf("*** You MUST do the command ***\n");
        printf("cat header.txt conns.txt > %s; rm header.txt conns.txt\n", argv[1]);
        printf("*** to create %s ***\n", argv[1]);
    }
} include <stdio.h>
include <math.h>
#include <tools.h>
#include <constants.h>
#include <structures.h>
include <globals.h> define BIG_WEIGHT  3.0     /* magnitude above which weights aren't
                               considered for pruning (necessary to
                               keep all the small weights from getting
                               put in the same bucket during histogramming */
int max_group = 1;          /* highest unit group number */

/***********************************************************************
histogram
***********************************************************************/
histogram(array, size, range, start)
    float *array;
    int   size;
    float *range, *start;
{
    int i;
    float max = -1000.0, min = 1000.0;
    register int element;
    float percentile;

for (i = 0; i < HIST_RESOLUTION; i++) {
        hist[i] = 0;
    } for (element = 0; element < size; element++) {
        if (array[element] > max)
            max = array[element];
        if (array[element] < min)
            min = array[element];
    }

*range = max - min;
    *start = min;

for (element = 0; element < size; element++) {
        percentile = (array[element] - min) /
                (max - min + 0.000001);
        hist[(int)(percentile * HIST_RESOLUTION)]++;
    }
}

/***********************************************************************
histogram_middle
***********************************************************************/
histogram_middle(array, size, percent_to_elim, neg_thresh, pos_thresh)
    float *array;
    int   size;
    float percent_to_elim;
    float *neg_thresh, *pos_thresh;
{
    int middle_bucket, delta_bucket;
    int total_pixels_so_far;
    int num_to_prune = (int)(size * percent_to_elim);
    float range, start;

histogram(array, size, &range, &start);

middle_bucket = (-1 * start) / (range / (float)HIST_RESOLUTION);
    delta_bucket = 0;
    total_pixels_so_far = 0;
```

```
    while ((total_pixels_so_far < num_to_prune) &&
        (delta_bucket < (HIST_RESOLUTION / 2))) {
      total_pixels_so_far += hist[middle_bucket + delta_bucket];
      if (delta_bucket != 0) /* count middle bucket only once */
        total_pixels_so_far += hist[middle_bucket - delta_bucket];
      delta_bucket++;
    }
    *pos_thresh = (middle_bucket + delta_bucket) *
        (range / (float)(HIST_RESOLUTION)) + start;
    *neg_thresh = (middle_bucket - delta_bucket) *
        (range / (float)(HIST_RESOLUTION)) + start;
}

/*********************************************************************
  histogram_ends
*********************************************************************/
histogram_ends(array, size, percent_to_elim, min, max)
    float *array;
    int size;
    float percent_to_elim;
    float *min, *max;
{
  int delta_bucket;
  int total_pixels_so_far;
  int num_to_prune = (int)(size * percent_to_elim);
  float range, start;

histogram(array, size, &range, &start);

delta_bucket = 0;
  total_pixels_so_far = 0;
  while ((total_pixels_so_far < (num_to_prune / 2)) &&
      (delta_bucket < (HIST_RESOLUTION / 2))) {
    total_pixels_so_far += hist[delta_bucket];
    delta_bucket++;
  }
  *min = (delta_bucket) *
      (range / (float)(HIST_RESOLUTION)) + start;

delta_bucket = 0;
  total_pixels_so_far = 0;
  while ((total_pixels_so_far < (num_to_prune / 2)) &&
      (delta_bucket < (HIST_RESOLUTION / 2))) {
    total_pixels_so_far += hist[(HIST_RESOLUTION - 1) - delta_bucket];
    delta_bucket++;
  }
  *max = ((HIST_RESOLUTION - 1) - delta_bucket) *
      (range / (float)(HIST_RESOLUTION)) + start;
}

/*********************************************************************
  mark_pruned_conns
*********************************************************************/
void mark_pruned_conns(weight_list,
                       index_list,
                       num_conns,
                       neg_thresh,
                       pos_thresh)
    float weight_list[MAX_CONNS];
    int index_list[MAX_CONNS];
    int num_conns;
    float neg_thresh, pos_thresh;
{
  int conn_num;
  int conn_index; /* the index in the conn array for the current connection */ for (conn_num = 0; conn_num < num_conns; conn_num++) {
    if ((weight_list[conn_num] < 0.0) &&
        (weight_list[conn_num] > neg_thresh)) {
      conn_index = index_list[conn_num];
      pruned_conns[conn_index] = 1;
    }
    else if ((weight_list[conn_num] > 0.0) &&
```

```c
      (weight_list[conn_num] < pos_thresh)) {
    conn_index = index_list[conn_num];
    pruned_conns[conn_index] = 1;
      }
    }
  }
}

/*****************************************************************
copy_conn
*****************************************************************/
void copy_conn(from, to)
     struct conn_type *from, *to;
{
  to->weight = from->weight;
  to->dweight = from->dweight;
  to->gradweight = from->gradweight;
  to->prevgradweight = from->prevgradweight;
  to->num_inputs = from->num_inputs;
  to->yoke_group = from->yoke_group;
  to->from = from->from;
  to->to = from->to;
}

/*****************************************************************
remove_pruned_conns
*****************************************************************/
void remove_pruned_conns() { int conn_index, unit_index;
  int next_free = 0;

for (conn_index = 0; conn_index < n_conns; conn_index++) {
    if (pruned_conns[conn_index] == 1)
      permute_list[conn_index] = -1;  /* indicate that weight isn't present */
    else
      permute_list[conn_index] = next_free++;
  } for (conn_index = 0; conn_index < n_conns; conn_index++)
    if (permute_list[conn_index] != -1)
      copy_conn(&conn[conn_index], &conn[permute_list[conn_index]]);

n_conns = next_free;

/* update input connection counts */
  for (unit_index = 0; unit_index < n_units; unit_index++)
    unit[unit_index].num_inputs = 0;
  for (conn_index = 0; conn_index < n_conns; conn_index++)
    conn[conn_index].to->num_inputs++;
  for (conn_index = 0; conn_index < n_conns; conn_index++)
    conn[conn_index].num_inputs = conn[conn_index].to->num_inputs;
}

/*****************************************************************
prune_percent_conns
*****************************************************************/
void prune_percent_conns() { int conn_index;
  register struct conn_type *c;
  register struct unit_type *from_unit,*to_unit;
  int index_list[MAX_CONNS];  /* contains indices of conns in this layer */
  float weight_list[MAX_CONNS];  /* contains weights of conns in this layer */
  int num_conns = 0;          /* contains number of conns in this layer */
  float neg_thresh, pos_thresh; /* thresholds above and below which to pruning
                                   connections */

/* mark all conns as unpruned */
  for (conn_index = 0; conn_index < n_conns; conn_index++)
    pruned_conns[conn_index] = 0;

for (conn_index = 0; conn_index < n_conns; conn_index++) {
    c = &conn[conn_index];
    from_unit = c->from;
```

```c
  to_unit = c->to;
  if ((from_unit->index != 0) &&
      (FABS(c->weight) < BIG_WEIGHT)) { /* don't consider a weight for
                      pruning if it is really big */

/* not bias unit */
    index_list[num_conns] = conn_index;
    weight_list[num_conns] = c->weight;
    num_conns++;
  }
}
/* if there are actually weights to be pruned */
/* do the pruning */
if (num_conns > 0) {
  histogram_middle(weight_list,
                   num_conns,
                   percent_to_prune,
                   &neg_thresh,
                   &pos_thresh);
  mark_pruned_conns(weight_list,
                    index_list,
                    num_conns,
                    neg_thresh,
                    pos_thresh);
  remove_pruned_conns();
 }
}

/*************************************************************
  auto_prune_conns
 *************************************************************/
void auto_prune_conns() { float top_prune_percent = 1.0;
  float bot_prune_percent = 0.0;
  float change_error;
  float initial_error;
  int   last_n_conns = n_conns;
  float percent_change_n_conns;

write_net(fopen("/tmp/temp.net", "w"));
  write_weights(conn, fopen("/tmp/temp.wet", "w"));
  printf("\nPruning");

/* get initial error */
  sweep_forward(0, n_patterns);
  total_error = 0.0;
  error_patterns = 0;
  calc_error(0, n_patterns);
  initial_error = total_error / n_patterns;

percent_to_prune = (top_prune_percent + bot_prune_percent) / 2.0;

do {
    printf(".");
    fflush(stdout);
    /* revert to old network */
    load_network(fopen("/tmp/temp.net", "r"), 0);
    read_weights(conn, fopen("/tmp/temp.wet", "r"));

prune_percent_conns();

sweep_forward(0, n_patterns);
    total_error = 0.0;
    error_patterns = 0;
    calc_error(0, n_patterns);

change_error = ((total_error / n_patterns) - initial_error) / initial_error;
    percent_change_n_conns = (float)abs(last_n_conns - n_conns) / last_n_conns;
    last_n_conns = n_conns;

if (change_error <= (prune_error_sacrifice - 0.02))
      bot_prune_percent = percent_to_prune;
    else
      top_prune_percent = percent_to_prune;
```

```
    percent_to_prune = (top_prune_percent + bot_prune_percent) / 2.0;

} while (((change_error >= prune_error_sacrifice) ||
    (change_error <= (prune_error_sacrifice - 0.02))) &&
    (percent_change_n_conns > 0.02));

printf("\n");
total_error = 0.0;
error_patterns = 0;
unlink("/tmp/temp.net");
unlink("/tmp/temp.wet");

#ifdef DISPLAY
if (use_display)
    fix_display_after_pruning();
#endif
}

/******************************************************************
    hand_prune_conns
******************************************************************/
void hand_prune_conns() { int percent_pruning = 0;
    int conn_index;

/* mark all conns as unpruned */
    for (conn_index = 0; conn_index < n_conns; conn_index++)
        pruned_conns[conn_index] = 0;

get_int_defaut("Prune individual conns, or a fixed percent? (0 or 1)", &percent_pruning);

if (percent_pruning) {
        get_float_defaut("Percent to prune? (0.0 - 1.0)", &percent_to_prune);
        prune_percent_conns();
    }
ifdef DISPLAY
    else {
        hand_mark_conns();
        remove_pruned_conns();
    }
endif ifdef DISPLAY
    if (use_display)
        fix_display_after_pruning();
#endif
} include <stdio.h>
include <math.h>
#include "constants.h"
#include "structures.h"
#include "globals.h"

/******************************************************************
    add_ext
******************************************************************/
char *add_ext(root, ext)
    char *root, *ext;
{
    char filename[256];

sprintf(filename, "%s%s", root, ext);
    return(filename);
}
/******************************************************************
    compute_sigmoid
******************************************************************/
float compute_sigmoid(x)
    double x;
{
    float e;

if (x > 50.0)
```

```c
        return(1.0);
  if (x < -50.0)
        return(0.0);
  e = exp(x);
  return(e / (e + 1.0));
}

/*****************************************************************
  make_sigmoid_table
*****************************************************************/
void make_sigmoid_table ()
{
  int x;

for (x = -10000; x < 10000; x++)
        sigmoid_table[x+10000] = compute_sigmoid(x / 200.0);
}

/*****************************************************************
  randomize_weights
*****************************************************************/
void randomize_weights(cstart)
     struct conn_type *cstart;
{
  struct conn_type *c,*clim;
  float max_weight;
  float yoked_weight[MAX_YOKE_GROUPS];
  int i;

if (yoking_flag) {
    for (i = 0; i < MAX_YOKE_GROUPS; i++)
      yoked_weight[i] = 100000.0;
  } for (c = cstart,clim=cstart+n_conns; c < clim; c++) {
    if ((c->yoke_group < 0) ||
        (yoked_weight[c->yoke_group] == 100000.0)) {
      /* if unyoked, or yoked but not yet initialized, make random weight */
      max_weight = 1.0 / (float)SQRT((double)c->num_inputs);
      c->weight = RAND_FLOAT(-max_weight, max_weight);
      if (c->yoke_group >= 0) {
        /* save random weight for assignment to later yoked weights */
        yoked_weight[c->yoke_group] = c->weight;
      }
    }
    else {
      /* assign weight the value already computed for its brother yoked
         weight */
      c->weight = yoked_weight[c->yoke_group];
    }
  } epoch = 1;
}

/*****************************************************************
  prompt_file
*****************************************************************/
FILE *prompt_file(the_prompt,mode)
     char *the_prompt,*mode;
{
  char    filename[FILENAMELEN];
  FILE *workfp;
  int success = 1;

do {
    if (!success) printf("Can't open %s.\n",filename);
    printf (the_prompt);
    scanf ("%s", filename);
    success = ((workfp = fopen (filename, mode)) != NULL);
  } while (!success);
```

```c
    return (workfp);
}

/*****************************************************************
  prompt_string
*****************************************************************/
char *prompt_string(the_prompt, string)
    char *the_prompt,*string;
{
 printf(the_prompt);
 scanf("%s", string);
 return(string);
}

/*****************************************************************
  punt
*****************************************************************/
void punt(s1, s2)
    char *s1,*s2;
{
 printf(s1, s2);
 printf("\n");
 printf("Punting...\n");
 exit(1);
}

/*****************************************************************
  get_boolean
*****************************************************************/
int get_boolean(s1,answer)
    char *s1;
    int *answer;
{
 char c[10];

do {
      printf (s1);
      printf (" (y/n) ");
      scanf ("%s", c);
 } while (c[0] != 'y' && c[0] != 'n');
 *answer = ((c[0] == 'y') ? 1 : 0);
}

/*****************************************************************
  eat_white_space_cr
*****************************************************************/
void eat_white_space_cr() {
 int c;

do {
  c = getchar();
 } while (c == ' ' || c == '\t');

if (c != '\n')
  ungetc(c,stdin);
}

/*****************************************************************
  get_int_default
*****************************************************************/
void get_int_default(prompt, varble)
    char *prompt;
    int *varble;
{
 int response, matched;
 char c[100];

if (isatty(fileno(stdin))) {
  if ((stdin)->_cnt > 0)
   gets(c, 100);
```

```c
    printf("%s [%d] ", prompt, *varble);
  }
  gets(c, 100);
  matched = sscanf(c, "%d", &response);
  if (matched == 1)
    *varble = response;
  if (!isatty(fileno(stdin)))
    printf("new value [%d]\n", *varble);
}

/************************************************************
  get_float_defaut
************************************************************/
void get_float_defaut(prompt, varble)
    char *prompt;
    float *varble;
{
  float response;
  int matched;
  char c[100];

if (isatty(fileno(stdin))) {
    if ((stdin)->_cnt > 0)
      gets(c, 100);
    printf("%s [%f] ", prompt, *varble);
  }
  gets(c, 100);
  matched = sscanf(c, "%f", &response);
  if (matched == 1)
    *varble = response;
  if (!isatty(fileno(stdin)))
    printf("new value [%f]\n", *varble);
}

/************************************************************
  check_max
************************************************************/
void check_max(n,mx,st)
    int n,mx;
    char *st;
{
  if (n > mx)
    panic("Maximum number of %s exceeded.",st);
}
```

```
VERSION = 2.7
CODE_NAME = ebp
DEPS = -DDISPLAY
include /usr/vision/lib/libgimage.make
GIL_LIBS = ${LIBGIMAGE}
GIL_INCL = -I/usr/vision/include
MISC_INCL = -I/usr/pomerica/include -I.
LIBS = ${GIL_LIBS} -lm
CFLAGS = -O4 -fsingle ${DEPS} ${GIL_INCL} ${MISC_INCL}
SOURCES = initialize.c backprop.c ssto.c io.c display.c prune.c utils.c main.c
OBJECTS = initialize.o backprop.o ssto.o io.o display.o prune.o utils.o main.o
AUX_FILES = Makefile constants.h structures.h globals.h \
        binize.c make_net.c
ebp: ${OBJECTS}
        cc ${CFLAGS} ${OBJECTS} -o ebp ${LIBS}
```

```
initialize.o: constants.h structures.h globals.h
backprop.o : constants.h structures.h globals.h
auto.o : constants.h structures.h globals.h
io.o : constants.h structures.h globals.h
display.o : constants.h structures.h globals.h
prune.o : constants.h structures.h globals.h
utils.o : constants.h structures.h globals.h
main.o : constants.h structures.h globals.h binize: binize.c utils.o constants.h structures.h globals.h
        cc $(CFLAGS) binize.c utils.o -o binize $(LIBS)

make_net: make_net.c
        cc $(CFLAGS) make_net.c -o make_net $(LIBS)

backup: $(SOURCES) $(AUX_FILES)
        /bin/rm -rf ./v$(VERSION)
        mkdir ./v$(VERSION)
        tar cf $(CODE_NAME).v$(VERSION).tar $(SOURCES) $(AUX_FILES)
        mv $(CODE_NAME).v$(VERSION).tar ./v$(VERSION)
        touch backup
```

What is claimed is:

1. A security system comprised of:
    means for monitoring an area under surveillance, said monitoring means producing difference images of the area;
    means for processing the difference images to determine whether the area is in a desired state or an undesired state, said processing means includes a trainable neural network to learn the difference between the desired state and the undesired state.

2. A system as described in claim 1 wherein the monitoring means includes a video camera which produces video difference images of the area.

3. A system as described in claim 2 wherein the processing means includes a computer simulating the neural network.

4. A system as described in claim 3 including an alarm which is triggered by the computer when an undesired state is determined to exist in the area.

5. A system as described in claim 4 wherein the image of the area is comprised of pixels, each pixel having a value corresponding to the amount of light associated with the pixel; and wherein said computer compares the values of pixels of a most recent image of the area with the values of pixles of an earlier in time image of the area to produce a difference image comprised of pixels, each of which have a value corresponding to the difference in values between corresponding pixels of the most recent image and the earlier in time image; and wherein said neural network simulated by said computer having weights for each pixel network simulated by said computer having weights for each pixel which are multiplied by the respective pixel value of the difference image and then added together to form a sum, which if greater than a predetermined amount, results in the computer triggering the alarm.

6. A system as described in claim 5 wherein the monitoring means includes additional sensors, that together with the video camera produces the difference image of the area, said value of each of the pixels of the image having a component corresponding to the additional sensors as well as a component corresponding to the amount of light associated with the pixel.

7. A system as described in claim 6 wherein the additional sensors include at least a second video camera.

8. A system as described in claim 7 wherein the additional sensors include infrared motion detectors.

9. A system as described in claim 6 wherein the additional sensors include microwave detectors.

10. A system as described in claim 6 wherein the additional sensors include infrared motion detectors.

11. A system as described in claim 8 wherein the additional sensors include microwave detectors.

12. An apparatus as described in claim 1 wherein the trainable neural network uses back propagation techniques.

13. A method for determining whether an area under surveillance is in a desired state or the undesired state;
    collecting difference images in a computer about the area which defines when the area is in the desired state or the undesired state;
    training the computer from the difference images to essentially correcting identify when the area is in the desired state or in the undesired state while the area is under surveillance; and
    performing surveillance of the area with the computer such that the computer determines whether the area is in the desired state or the undesired state.

14. A method as described in claim 13 including after the performing step, the step of activating an alarm when the computer determines the area is the undesired state.

15. A method as described in claim 13 including after the performing step, the step of repeating the training step if the area's state determined by the computer is incorrect for a given scene of the area such that the computer does not make the same mistake about the state of the area for the given scene.

* * * * *

UNITED STATES PATENT AND TRADEMARK OFFICE
CERTIFICATE OF CORRECTION

PATENT NO. : 5,091,780
DATED : February 25, 1992
INVENTOR(S) : Dean A. Pomerleau It is certified that error appears in the above-identified patent and that said Letters Patent is hereby corrected as shown below:

```
On the title page, Item [54]: replace "EMTHOD" with --METHOD.
On the title page, Item [54]: before "METHOD" insert --AND--.
Column 1, line 1, in the title, replace "EMTHOD" with --METHOD--.
Column 2, line 50, replace ".list of lines" with -- "list of lines" --.
```

Signed and Sealed this

Twenty-third Day of November, 1993

Attest:

BRUCE LEHMAN

*Attesting Officer*  *Commissioner of Patents and Trademarks*